(12) United States Patent
Baskaran et al.

(10) Patent No.: US 12,464,362 B2
(45) Date of Patent: Nov. 4, 2025

(54) SUBSCRIPTION ONBOARDING USING A VERIFIED DIGITAL IDENTITY

(71) Applicant: Lenovo (Singapore) Pte. Ltd., New Tech Park (SG)

(72) Inventors: Sheeba Backia Mary Baskaran, Friedrichsdorf (DE); Apostolis Salkintzis, Athens (GR); Andreas Kunz, Ladenburg (DE); Genadi Velev, Darmstadt (DE); Roozbeh Atarius, La Jolla, CA (US); Ishan Vaishnavi, Munich (DE); Emmanouil Pateromichelakis, Viersen (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 134 days.

(21) Appl. No.: 18/252,183

(22) PCT Filed: Nov. 6, 2020

(86) PCT No.: PCT/EP2020/081375
§ 371 (c)(1),
(2) Date: May 8, 2023

(87) PCT Pub. No.: WO2022/196126
PCT Pub. Date: May 12, 2022

(65) Prior Publication Data
US 2023/0413060 A1    Dec. 21, 2023

(51) Int. Cl.
*H04L 29/06*    (2006.01)
*H04L 9/32*    (2006.01)
(Continued)

(52) U.S. Cl.
CPC ............ *H04W 12/72* (2021.01); *H04L 9/3247* (2013.01); *H04L 9/3297* (2013.01); *H04W 12/75* (2021.01)

(58) Field of Classification Search
None
See application file for complete search history.

(56) References Cited

U.S. PATENT DOCUMENTS 8,555,361 B2 * 10/2013 Nakhjiri et al. ...... H04L 63/061
                                                              380/247
8,910,241 B2 * 12/2014 Pollutro .............. G06F 21/6218
                                                              726/13
(Continued)

FOREIGN PATENT DOCUMENTS

EP    2830016 A1    1/2015
WO    2020139513 A1    7/2020

OTHER PUBLICATIONS

PCT/EP2020/081375, "Notification of Transmittal of the International Search Report and the Written Opinion of the International Searching Authority, or the Declaration", International Searching Authority, May 17, 2021, pp. 1-17.
(Continued)

*Primary Examiner* — Maung T Lwin
(74) *Attorney, Agent, or Firm* — Kunzler Bean & Adamson

(57) ABSTRACT

Apparatuses, methods, and systems are disclosed for Digital Identifier-based subscription onboarding. One apparatus includes a memory coupled to a processor, the memory storing instructions executable by the processor to control the apparatus to acquire a Digital Identifier ("DIG-ID") comprising a verifiably secure identity, and to generate a digital signature of the DIG-ID and a timestamp using a private key. The instructions are executable by the processor to control the apparatus to send a first request to a mobile
(Continued)

communication network and to receive a response containing an onboarding authentication success indication and a verified DIG-ID, the first request including the DIG-ID, the timestamp and the digital signature. The instructions are executable by the processor to establish a provisioning connection to the mobile communication network and to receive a subscription credential and/or a user subscription profile via the provisioning connection.

20 Claims, 11 Drawing Sheets

(51) Int. Cl.
*H04W 12/72* (2021.01)
*H04W 12/75* (2021.01)

(56) References Cited

U.S. PATENT DOCUMENTS

| | | | | |
|---|---|---|---|---|
| 9,853,977 | B1* | 12/2017 | Laucius | H04L 63/0884 |
| 10,743,176 | B1 | 8/2020 | Khan et al. | |
| 2015/0032655 | A1* | 1/2015 | Said | H04W 4/21 |
| | | | | 705/321 |
| 2015/0326563 | A1* | 11/2015 | Chan | H04N 21/4367 |
| | | | | 713/172 |
| 2020/0021993 | A1* | 1/2020 | Yang et al. | H04L 63/123 |

OTHER PUBLICATIONS

Devanesan, "Samsung looks to 6G and beyond with blockchain and AI", Techwire Asia, https://techwireasia.com/2020/09/samsung-looks-to-6g-and-beyond-with-blockchain-and-ai/, Sep. 10, 2020, pp. 1-10.

European Commission, "eIDAS Regulation", https://ec.europa.eu/digital-single-market/en/trust-services-and-eid, https://digital-strategy.ec.europa.eu/en/policies/eidas-regulation, Jun. 7, 2022, pp. 1-8.

GMSA, "Blockchain for Development: Emerging Opportunities for Mobile, Identity and Aid", https://www.gsma.com/mobilefordevelopment/wp-content/uploads/2017/12/Blockchain-for-Development.pdf, 2017, pp. 1-17.

ITU News, "How mobile operators can help create an inclusive digital identity system", https://news.itu.int/mobile-operators-digital-identity-system/, Jul. 23, 2018, pp. 1-11.

Ledger Insights, "SK Telecom, Deutsche Telekom plan blockchain digital identity", https://www.ledgerinsights.com/sk-telecom-deutsche-telekom-blockchain-digital-identity/, Feb. 21, 2019, pp. 1-13.

Seregin, "SK Telecom und Deutsche Telekom mit Blockchain ID-System", https://blockchainwelt.de/sk-telecom-und-deutsche-telekom-kooperieren-bei-blockchain-id-system/, Apr. 20, 2022, pp. 1-7.

W3C, "Decentralized Identifiers (DIDs) v1.0 Core architecture, data model, and representations", https://www.w3.org/TR/did-core/, Jul. 19, 2022, pp. 1-147.

Thales, "Digital Customer Onboarding with Trusted Digital Identities (Whitepaper)", https://www.thalesgroup.com/en/markets/digital-identity-and-security/mobile/documents/digital-onboarding-digital-identity, 2023, pp. 1-5.

Thales, "Digital identity 2.0—Self-sovereign identities at work", https://www.thalesgroup.com/en/markets/digital-identity-and-security/banking-payment/digital-identity, 2023, pp. 1-7.

3GPP, "3rd Generation Partnership Project; Technical Specification Group Services and System Aspects; Security architecture and procedures for 5G system (Release 16)", 3GPP TS 33.501 V16.4.0, Sep. 2020, pp. 1-250.

W3C, "Eidas Supported Self-Sovereign Identity", https://ec.europa.eu/futurium/en/system/files/ged/eidas_supported_ssi_may_2019_0.pdf, May 2019, pp. 1-13.

Windley, "Multi-Source and Self-Sovereign Identity", https://www.windley.com/archives/2018/09/multi-source_and_self-sovereign_identity.shtml, Sep. 10, 2018, pp. 1-7.

* cited by examiner

SUBSCRIPTION ONBOARDING USING A VERIFIED DIGITAL IDENTITY

FIELD

The subject matter disclosed herein relates generally to wireless communications and more particularly relates to digital-ID-based subscription onboarding.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), AAA Proxy ("AAA-P"), Positive-Acknowledgment ("ACK"), Authentication and Key Agreement ("AKA"), Access and Mobility Management Function ("AMF"), Application Programming Interface ("API"), Authentication Credential Repository and Processing Function ("ARPF"), Access Stratum ("AS"), Application Server ("AS"), Authentication Server Function ("AUSF"), Authentication Token ("AUTN"), Authentication Vector ("AV"), Base Station ("BS"), Blockchain Service Enabler Function ("BSEF"), Bandwidth Part ("BWP"), Clear Channel Assessment ("CCA"), Code Division Multiple Access ("CDMA"), Control Element ("CE"), Cyclic Prefix ("CP"), Channel State Information ("CSI"), Configured Grant ("CG"), Core Network ("CN"), Control Plane ("CP"), Decentralikzed Identifier ("DID"), Digital Identifier ("DIG-ID"), Digital Signature ("DS"), Distributed Ledger Technology ("DLT"), Digital Identification, Authentication and Trust Services Enabler Function ("D-IDASEF"), Digital ID-based Subscription Permanent Identifier ("D-SUPI"), Downlink Control Information ("DCI"), Downlink ("DL"), Discontinuous Transmission ("DTX"), Enhanced Clear Channel Assessment ("eCCA"), Electronic Identification, Authentication and Trust Services ("eIDAS"), Enhanced Mobile Broadband ("eMBB"), Evolved Node-B ("eNB"), Evolved Packet Core ("EPC"), Evolved Packet System ("EPS"), Evolved UMTS Terrestrial Radio Access ("E-UTRA"), Evolved UMTS Terrestrial Radio Access Network ("E-UTRAN"), European Telecommunications Standards Institute ("ETSI"), General Packet Radio Service ("GPRS"), Global System for Mobile Communications ("GSM"), Hybrid Automatic Repeat Request ("HARQ"), Home Subscriber Server ("HSS"), Home Public Land Mobile Network ("HPLMN"), Identity ("ID", also an acronym for related concepts 'Identifier' or 'Identification'), Identity Provider ("IDP"), Identity Service Provider ("IDSP"), Identity Framework ("IDF"), Information Element ("IE"), Internet-of-Things ("IoT"), Listen-Before-Talk ("LBT"), Long Term Evolution ("LTE"), Multiple Access ("MA"), Mobility Management ("MM"), Mobility Management Entity ("MME"), Mobile Network Operator ("MNO"), Master Session Key ("MSK"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), NR using unlicensed spectrum ("NR-U"), Non-Access Stratum ("NAS"), Network Exposure Function ("NEF"), Number Used Once ("Nonce"), Network Slice Selection Assistance Information ("NSSAI"), Onboarding Assistance Information ("OAI"), Permissioned Distributed Ledger ("PDL"), Packet Data Unit ("PDU", used in connection with "PDU Session"), Packet Switched ("PS", e.g., Packet Switched domain or Packet Switched service), Primary Cell ("PCell"), Physical Downlink Control Channel ("PDCCH"), Packet Data Network ("PDN"), Physical Downlink Shared Channel ("PDSCH"), PDN Gateway ("P-GW"), Physical Hybrid Automatic Repeat Request Indicator Channel ("PHICH"), Physical Random-access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Radio Access Network ("RAN"), Radio Resource Control ("RRC"), Random-Access Channel ("RACH"), Random-access Response ("RAR"), Reference Signal ("RS"), Registration Area ("RA", similar to tacking area list used in LTE/EPC), Receive ("RX"), Radio Link Control ("RLC"), Single Carrier Secondary Cell ("SCell"), Shared Channel ("SCH"), Serving Gateway Security Anchor Function ("SEAF"), Subscription Identifier De-concealing Function ("SIDF"), ("S-GW"), Session Management ("SM"), Security Mode Command ("SMC"), Session Management Function ("SMF"), Serving Network Identifier ("SN Id"), Service Provider ("SP"), Single Network Slice Selection Assistance Information ("S-NSSAI"), Sounding Reference Signal ("SRS"), Self-Sovereign Identifier ("SSI"), Subscription Concealed Identifier ("SUCI"), Subscription Permanent Identifier ("SUPI"), Timing Alignment Timer ("TAT"), Tracking Area ("TA"), Transport Block ("TB"), Transport Block Size ("TBS"), Timestamp ("TS"), Trust Service Provider ("TSP"), Transmission Time Interval ("TTI"), Transmit ("TX"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), World Wide Web Consortium ("W3C"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

The Mobile Network Operators ("MNOs") as part of Know-Your-Customer ("KYC") requirements are subject to mandatory SIM registration obligations which require customers to present Government recognized identity credentials before a SIM card can be activated. In most cases, these KYC regulations only allow customers to present identity documents that have been issued by government authorities, such as national identity cards, passports, or drivers' licenses.

BRIEF SUMMARY

Disclosed are procedures for digital-ID-based subscription onboarding. Said procedures may be implemented by apparatus, systems, methods, and/or computer program products.

One method of a UE includes acquiring a digital identifier ("DIG-ID"), said digital identifier comprising a verifiably secure identity, and generating a digital signature of the DIG-ID and a timestamp using a private key. The method includes sending a first request to a mobile communication network and receiving a first response, where the first request includes the DIG-ID, the timestamp and the generated digital signature, and where the first response includes an onboarding authentication success indication and a verified DIG-ID. The method includes establishing a provisioning connection to the mobile communication network and receiving a subscription credential and/or a user subscription profile via the provisioning connection.

One method of a network function includes receiving a first request, the message containing a DIG-ID of a UE, a timestamp and a digital signature, where the digital identifier includes a verifiably secure identity. The method includes identifying a trust service provider based on the DIG-ID and sending a verification request to the trust service provider. Here, the verification request contains the DIG-ID, the timestamp, the digital signature, a minimum data set request, and a security key request. The method includes receiving a verified DIG-ID, a verification result, a DIG-ID lifetime, MDS information and the onboard root key from the service provider in response to successful verification of the DIG-ID. The method includes invoking subscription provisioning of the UE based on the MDS information, where the subscription provisioning is protected using the onboard root key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
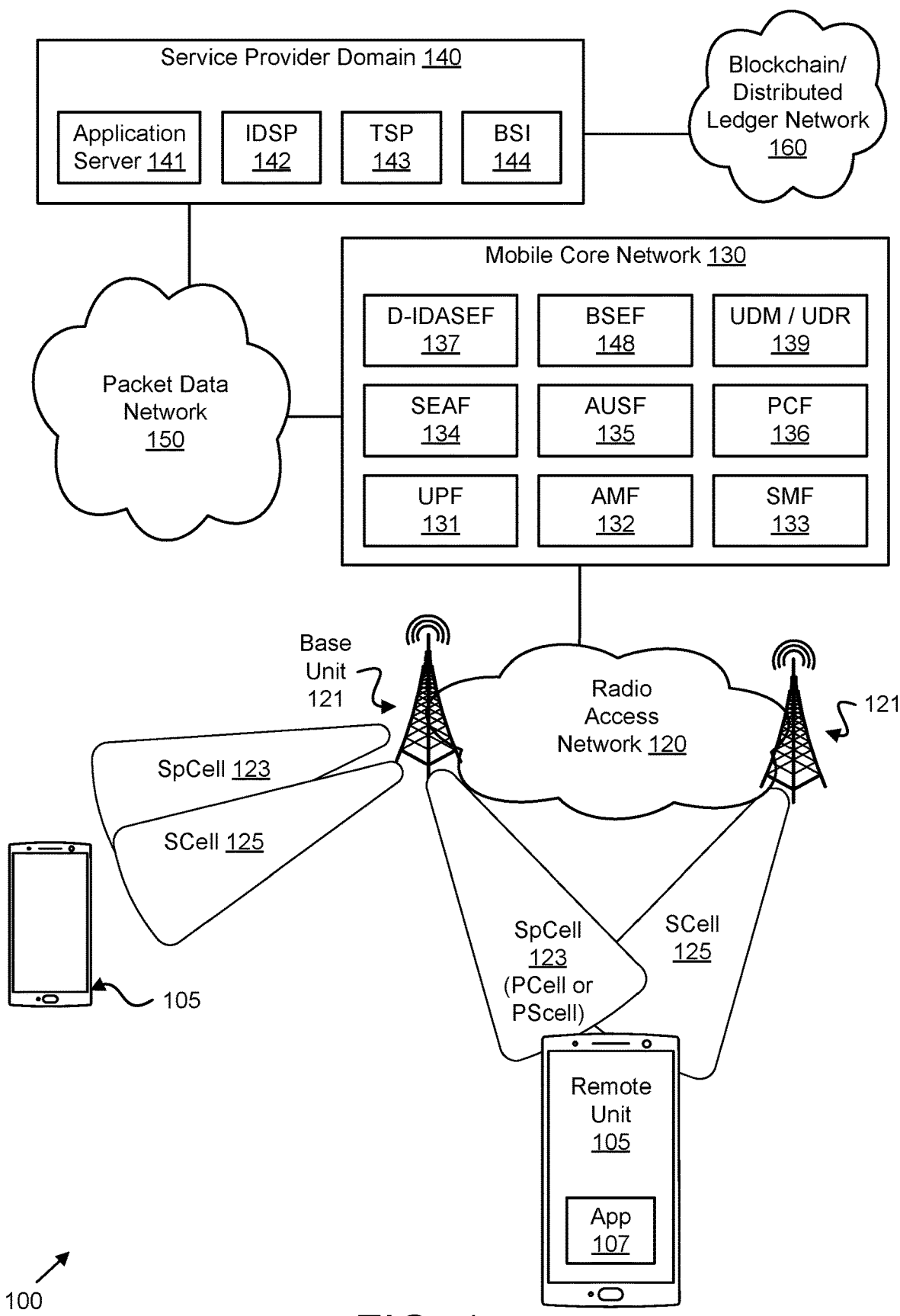
FIG. 1 is a schematic block diagram illustrating one embodiment of a wireless communication system for digital-ID-based subscription onboarding.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for digital-ID-based subscription onboarding. Described herein is subscriber/user authentication and subscription provisioning for UE based on the digital identifier to enable on-demand network access and services for a UE. Also described is digital identifier-based subscription handling to mitigate Identity fraud and risks. The disclosure addresses the following problem related to the mobile networks.

Identity Fraud and complexity involved in legacy Know-Your-Customer ("KYC") process related to SIM activation is a critical issue. So, the mobile network operators are migrating towards adoption of digital KYC and online sign up to support more On-demand services. The vertical service provider market is evolving with the digital transformation, whereas the current 3GPP mobile network does not support on-demand user identification, authentication and network subscription management to enable User on-demand services (either from MNO or from different service providers) in the digital market.

Few use cases that require digital customer identification and subscription handling includes Service Subscription provisioning to devices without USIMs/UICCs, Pay per Use model (i.e., where the users buy and use services on-the-go without buying a dedicated SIM), Temporary Service subscription (i.e., a user visiting a foreign country can buy a temporary subscription from the local MNO for the period of stay. In a different scenario, such as a Network as a service model, where in some locations, a 5G network can be available/deployed for ad hoc and/or temporary events, to provide 5G coverage and connectivity to local users or devices, e.g. Sport venues/stadiums, etc.).

However, KYC processes can be expensive, time-consuming, and potentially troublesome for service providers, particularly when MNOs are obligated to validate customers' ID credentials against a government database and are charged a fee for each validation query they make. In addition to the operating costs associated with customer enrollment, data protection and document management, cases of identity fraud can lead to heavy fines and damage a company's brand reputation.

As IoT devices explode in number, the embedded SIM technology is evolving and replacing the physical SIM cards. In general, the USIM/UICC stores the subscription information along with the IMSI (International mobile subscription Identifier) and they are responsible for authenticating subscribers on a mobile network, to access the network and to avail the subscription related services. The eSIM and iSIM largely dependent on Remote SIM Provisioning ("RSP") solutions. Identity Fraud and complexity involved in KYC process related to SIM activation for network access becomes a huge threat to the mobile operators and subscribers.

With the increasing number of IoT devices, there is a higher chance that the devices without USIMs will also play a significant role in the IoT and vertical service ecosystem. Currently the mobile operators and 3GPP network supports only traditional KYC, i.e. the subscriber can obtain the SIM card and activate subscription only after a legacy identity check, e.g. passport, in the shop, afterwards SIM based subscription activation and user identification authentication process to provide network access and service. To enable on-demand subscription and user identification management in the evolving digital market, so far, the 3GPP network does not have any digital subscription and identification handling method neither any standard Subscription onboarding method.

Described herein are procedures to support digital ID verification to enable user authentication and following a successful digital ID verification, provisioning of user subscription information to the UE to enable network service access. Embodiments are described in FIGS. 2-5, which cover the scenarios where the UE attempts for the network access by providing a Digital ID to fetch subscription information from the network as part of onboarding to the MNO network (e.g., in an operator's network for PLMN/NPN/Content provider's service provision).

FIG. 1 depicts a wireless communication system 100 for digital-ID-based subscription onboarding, according to embodiments of the disclosure. In one embodiment, the wireless communication system 100 includes at least one remote unit 105, a radio access network ("RAN") 120, a mobile core network 130, and a service provider domain 140. The RAN 120 and the mobile core network 130 form a mobile communication network. The mobile communication network can provide a remote unit 105 with access to one or more services offered by the service provider domain 140. The RAN 120 may be composed of a base unit 110 with which the remote unit 105 communicates using wireless communication links. Even though a specific number of remote units 105, base units 110, RANs 120, mobile core networks 130, and service provider domains 140 are depicted in FIG. 1, one of skill in the art will recognize that any number of remote units 105, base units 110, RANs 120, mobile core networks 130 and service provider domains 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the wireless communication links. Here, the RAN 120 is an intermediate network that provides the remote units 105 with access to the mobile core network 130.

In some embodiments, the remote units 105 communicate with an application server 141 via a network connection with the mobile core network 130. For example, a mobile application 107 (e.g., web browser, media client, telephone/VoIP application) in a remote unit 105 may trigger the remote unit 105 to establish a PDU session (or other data connection) with the mobile core network 130 via the RAN 120. The mobile core network 130 then relays traffic between the remote unit 105 and the application server 141 in the service provider domain 140 using the PDU session. The PDU session represents a logical connection between the remote unit 105 and the UPF 131. In order to establish the PDU session, the remote unit 105 must be registered with the mobile core network. Note that the remote unit 105 may establish one or more PDU sessions (or other data connections) with the mobile core network 130. As such, the remote unit 105 may concurrently have at least one PDU session for communicating with the service provider domain 140 and at least one PDU session for communicating with another data network (e.g., the packet data network 150). Other examples of the mobile application 107 include a User agent, an ID Service application, a Trust Service application, a Subscription Profile Management Service application, blockchain/DLT wallet, as discussed below with reference to FIGS. 2-5.

The base units 121 may be distributed over a geographic region. In certain embodiments, a base unit 121 may also be referred to as an access terminal, an access point, a base, a base station, a Node-B, an eNB, a gNB, a Home Node-B, a relay node, a RAN node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link. As depicted, a base unit 121 may support a special cell 123 (i.e., a PCell or PSCell) and/or a SCell 125. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links. The wireless communication links may be any suitable carrier in licensed or unlicensed radio spectrum. The wireless communication links facilitate communication between one or more of the remote units 105 and/or one or more of the base units 121.

In one embodiment, the mobile core network 130 is a 5G core ("5GC") or the evolved packet core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes one or more user plane functions ("UPFs") 131. The mobile core network 130 also includes multiple control plane functions including, but not limited to, an Access and Mobility Management Function ("AMF") 132 that serves the RAN 120, a Session Management Function ("SMF") 133, a Security Anchor Function ("SEAF") 134, an Authentication Server Function ("AUSF") 135, a Policy Control Function ("PCF") 136, a Digital Identification, Authentication and trust Services Enabler Function ("D-IDASEF") 137, and Blockchain Service Enabler Function ("BSEF") 138, and a Unified Data Management/User Data Repository function ("UDM/UDR") 139. In various embodiments, the mobile core network 130 may also include a Network Repository Function ("NRF") (used by the various NFs to discover and communicate with each other over APIs), a Network Exposure Function ("NEF"), or other NFs defined for the 5GC. In various embodiments, the AUSF 135 provides onboarding functions for the mobile core network 130, such as onboard enabler functions. In such embodiments, the AUSF 135 may be an Onboard Enabler AUSF ("O-AUSF").

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. Each network slice includes a set of CP and/or UP network functions. A network instance may be identified by a S-NSSAI, while a set of network slices for which the remote unit 105 is authorized to use is identified by NSSAI. In certain embodiments, the various network slices may include separate instances of network functions, such as the SMF 133 and UPF 131. In some embodiments, the different network slices may share some common network functions, such as the AMF 132. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 130. Moreover, where the mobile core network 130 is an EPC, the depicted network functions may be replaced with appropriate EPC entities, such as an MME, S-GW, P-GW, HSS, and the like. In certain embodiments, the mobile core network 130 may include a AAA server.

The service provider domain 140 supports services in the wireless communication system 100. Examples of services provided via the service provider domain 140 may include, but are not limited to, Identity services, Trust services, Blockchain services, Distributed Ledger services, As depicted, the service provider domain 140 may include an Identity Service Provider ("IDSP") 142, a Trust Service Provider ("TSP") 143, and a Blockchain Service Infrastructure ("BSI") 144. The IDSP 142 and TSP 143 are described in greater detail, below. The IDSP 142 and TSP 143 provide Identity and Trust services, respectively, to the mobile core network 130 and/or remote unit 105. The BSI 144 interacts with the Blockchain/Distributed Ledger Network 160 to provide blockchain (e.g., distributed ledger) services to the mobile core network 130 and/or remote unit 105 to support storage of end user (or device) 105 generated digital ID and verifiable credentials in a decentralized platform to enable digital ID based end user authentication by the mobile core network 130.

While FIG. 1 depicts components of a 5G RAN and a 5G core network, the described embodiments for digital-ID-based subscription onboarding apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 132 may be mapped to an MME, the SMF 133 may be mapped to a control plane portion of a PGW and/or to an MME, the UPF 131 may be mapped to an SGW and a user plane portion of the PGW, the UDM/UDR 139 may be mapped to an HSS, etc.

In the following descriptions, the term "RAN Node" is used for the base station but it is replaceable by any other radio access node, e.g., gNB, eNB, BS, AP, NR, etc. Further the operations are described mainly in the context of 5G NR. However, the proposed solutions/methods are also equally applicable to other mobile communication systems supporting mobile subscription provisioning based on Digital ID authentication.

Figure 2:
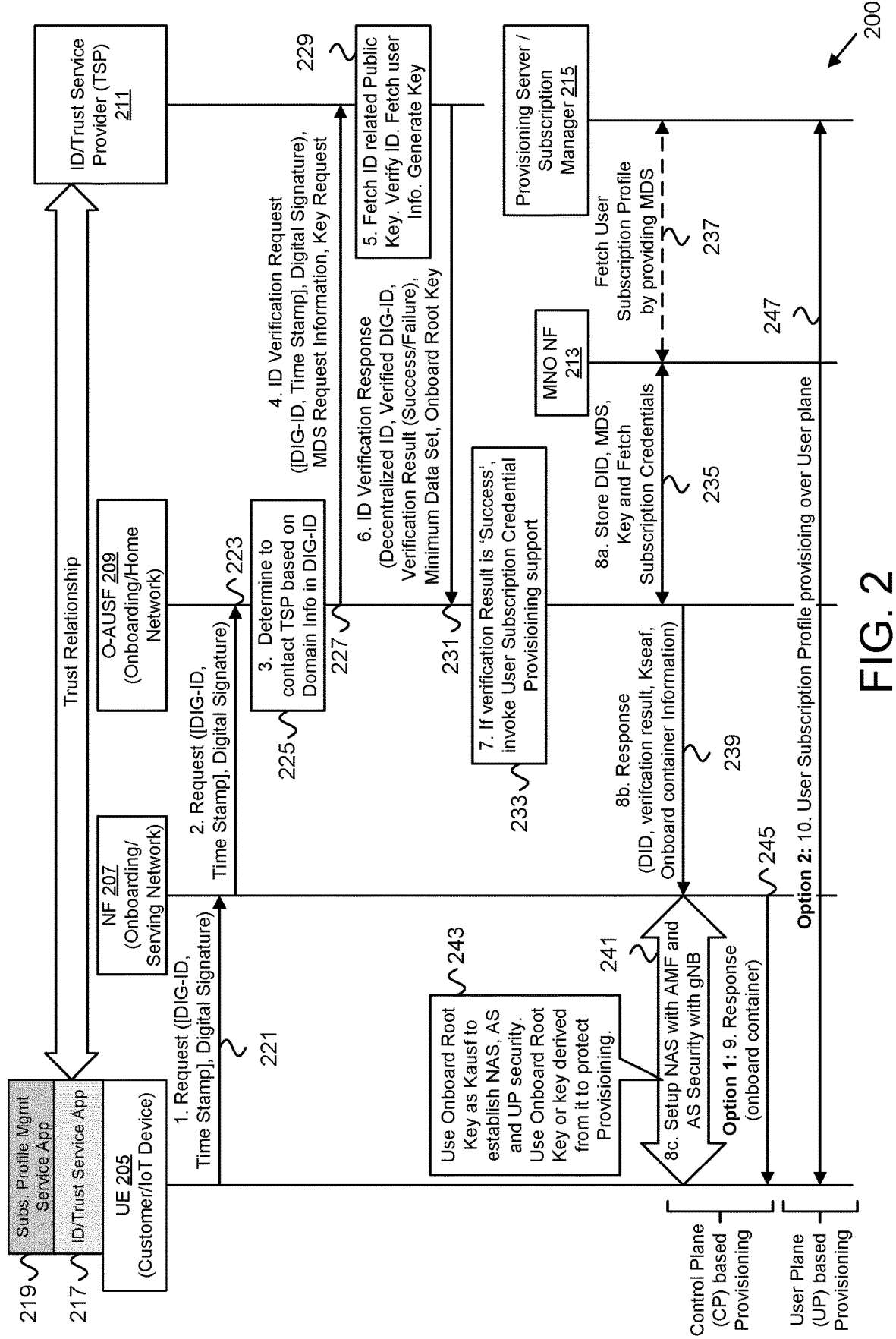
FIG. 2 is a diagram illustrating one embodiment of a procedure for Digital ID verification and subscription credentials/information provisioning to enable Subscriber Onboarding in MNO network for Network Service Access.

FIG. 2 depicts a procedure 200 for mobile subscription provisioning method (e.g., subscriber onboarding) based on Digital ID authentication, according to embodiments of the disclosure. The procedure 200 may be performed by a UE 205 which is served by a network function ("NF") 207 in a serving network and by an Onboard Enabler AUSF ("O-AUSF") 209. The procedure 200 also involves a Digital Identity and Trust Service Provider ("ID/TSP") 211, a NF which stores the onboarding related user information (depicted as "MNO NF" 213), and a provisioning server and/or subscription manager 215. The O-AUSF 209 may be the network function in the home network which is responsible to serve/handle the onboarding related services. The MNO NF 213 may communicate with the ID/TSP 211, where the ID/TSP may belong to a $3^{rd}$ party and/or maybe external to MNO. The ID/TSP 211 is the one which has access to the digital identifier infrastructure and DIG-ID related documents (i.e., verifiable claims) to verify a received DIG-ID and the user/owner of the DIG-ID. In one embodiment, the MNO NF 213 is located outside the MNO network. In another embodiment, the MNO NF 213 is located within the MNO network. In some embodiments, the serving network is the home network (e.g., H-PLMN). In other embodiments, the serving network is a visited/roaming network (e.g., V-PLMN), different than the home network.

In various embodiments, the UE 205 is one embodiment of the remote unit 105, the NF 207 is one embodiment of the AMF 132 and/or SEAF 134, and the O-AUSF 209 is one embodiment of AUSF 135. The MNO NF 213 may be one embodiment of the UDM/UDR 139. The procedure 200 shows how a user can onboard the UE 205 to a mobile operator's network by providing a digital ID to the network in order to get successfully authenticated and receive the network subscription information to enable network service access.

In various embodiments, the digital ID is a globally resolvable, cryptographically verifiable identifier (i.e., a verifiably secure user identifier or device identifier). In certain embodiments, the digital ID may be registered directly on a distributed ledger (e.g., a blockchain). Here, the UE 205 may be a distributed ledger technology ("DLT") end user device. In some embodiments, the digital ID is generated by the user device which needs to gain access to a Mobile Network Operator ("MNO") service by providing the digital ID to the MNO for user authentication. Upon a successful user authentication, the MNO (e.g., home network) provides either a temporary subscription credential or an actual subscription profile to onboard the user as the subscriber of the MNO network. Here, the determination of temporary versus actual may be based on the subscription purchase information.

A Digital ID ("DIG-ID") can contain/refer to any of the following identities:

A Decentralized ID ("DID"): The syntax of DID='did:' method-name ':' method-specific-id. An example DID is "did:example:123456789abcdefghi".

A Self-Sovereign ID ("SSI"): Here, the user or organization (e.g., MNO/Service provider) controls and manages their identity.

A Digital Onboarding ID, such as the Subscription Unique Onboarding ID ("SUOI") described below.

An overview of the solution shown in FIG. 2 involves the following steps.

As a precondition, it is assumed that the user has purchased an MNO network subscription from a shop or via an online-signup. However, here the user device does not contain any actual subscription credentials or information (or user subscription profile) related to the purchased subscription to access the network service. It is assumed that the MNO offers a limited access in its network to offer onboarding service to the user devices, whereas the onboarding network provides initial registration and/or access to the UE for UE Onboarding.

Optionally, the UE 205 may connect to the MNO network (e.g., a PLMN or NPN) and establish control plane and user plane connections with no security. The UE 205 may then use a mobile application or browser to generate a DIG-ID with a Trust service provider ("TSP"). In general, a TSP provides trust services for electronic transactions, while an ID service provider provides identity services for an electronic device, which is protected by the end-to-end application security. Note that the ID service provider and the trust service provider may be provided by the same service provider ("SP") and may be co-located. As used in herein, the TSP may refer to the trust service provider alone or a combined ID/trust service provider.

Alternatively, if the UE 205 has a wireless local area network connection (e.g., a Wi-Fi connection), it may generate a DIG-ID with the trust service provider separately or while buying an MNO subscription online. In this scenario, the user clearly links the DIG-ID related documents and user information that can be shared with the MNO along with the usage of the DIG-ID related information specified by the user.

During the online purchase of the subscription, the MNO portal or application may also provide means to link the ID/TSP related action and the MNO can provide to ID/TSP 211 any subscription related data (such as subscription type, MNO information and address or URL or URI of the provisioning server/subscription data management function which can provision the MNO related user subscription profile. The ID/TSP 211 stores DIG-ID, and the DIG-ID document address in a storage. The DIG-ID document address can resolve to any decentralized platform or database which actually stores the DIG-ID documents linked to the DIG-ID. The DIG-ID document can include a public key to verify the DIG-ID, user information (i.e., any verifiable credentials) as configured by the user according to the MNO subscription activation requirements and MNO subscription related information (if provided by the MNO)).

The UE 205 may locally store (in a Trusted secure platform, Smart Secure Platform, Digital platform, memory, and/or environment) all cryptographic information along with the generated DIG-ID. The cryptographic information may include one or more of: a device public/private key pair, a public key of the network and/or ID/TSP 211, cryptographic algorithms, or a shared secret key (e.g., known to the network and/or TSP 211). Similarly, the ID/TSP 211 may store cryptographic information, including a public/private key pair of the ID/TSP 211, a public key of the UE 205, cryptographic algorithms, or a shared secret key (e.g., known to the UE 205). Note also that the UE 205 may include an ID/Trust service application 217 which interacts with the ID/TSP 211 and a subscription profile management service application 219 which interacts with the Provisioning Server/Subscription Managers 215.

At Step 1, the UE 205 generates a DIG-ID using the ID/trust service provider related user agent or application or browser. The UE 205 generates a freshness parameter such as Timestamp (or any other freshness parameter may also be used). The UE 205 sends the DIG-ID, Timestamp, and the digital signature of the DIG-ID and Timestamp in a Request message to the NF 207 (e.g., an AMF) in the serving MNO's network (see messaging 221). In one example, the request is sent to the AMF in a N1 container. In certain embodiments, the Request may be a Registration Request message. Alternatively, the Request may be an Onboarding Request message.

Note that if the UE 205 has no means to generate a fresh DIG-ID online, then the UE 205 may generate a DIG-ID using any of its default biometrics (as configured with the ID/TSP 211) and protect it with the shared secret key linked to the user's trust service account and ID/TSP 211, append it to the public key of the ID/TSP 211 and time stamp. In addition, the user can also send a digital signature of the newly created DIG-ID, TSP public key ID and Time Stamp which can later help the TSP to decrypt the DIG-ID and verify it accordingly.

At Step 2, based on a DIG-ID type indication in the DIG-ID, the NF 207 forwards the received request with DIG-ID, Timestamp and the digital signature to an NF in the home network, such as the O-AUSF 209 (see messaging 223). The NF 207 forwards the request either directly or via another NF (e.g., via a SEAF) in the serving network. While the depicted embodiment shows the O-AUSF 209, it is understood that the O-AUSF 209 may be replaced with a different AUSF or with another network function (e.g., new NF or existing 3GPP NF) configured to handle onboarding in the core network.

At Step 3, upon receiving the request with DIG-ID, Timestamp and the digital signature, based on the domain information in the DIG-ID, the O-AUSF 209 determines to send an ID verification request to the ID/TSP 211 for DIG-ID verification and related user authentication (see block 225).

At Step 4, the O-AUSF 209 sends an ID verification request (i.e., a service operation message) to the ID/TSP 211 which includes the received DIG-ID, Timestamp, digital signature, any MNO preferred Minimum Data Set (MDS) Request information and a security key request.

At Step 5, the ID/TSP 211 on receiving the DID, may use a DID resolver or database to fetch the DID related documents. The ID/TSP 211 may also verify the verifier (i.e., verify MNO information to see if the MNO is authorized to request the verification service). Once the DID documents are fetched the ID/TSP 211 uses the DID related user public key to verify the digital signature. If the digital signature verification is successful, the ID/TSP 211 fetches the user information as configured by the user, additional MNO information, if stored, and generates an onboard root key from the shared secret key (see block 229).

At Step 6, the ID/TSP 211 sends the ID verification response (i.e., a service operation message) to the O-AUSF 209, which includes the verified DIG-ID (i.e., a DIG-ID), verification result, a minimum data set (user information and MNO subscription provisioning related URI/URL/address) and the onboard root key. Note that the verified DIG-ID may be the same as the DIG-ID send in step 4. After a successful verification of DIG-ID at the network side, the ID/TSP 211 sends with the Success indication the now verified DIG-ID, thus identifying to which DIG-ID the verification result applies.

At Step 7, upon receiving the ID verification response with success indication, the O-AUSF 209 determines whether to invoke a temporary subscription credential provisioning or an actual (i.e., non-temporary) subscription profile provisioning, based on the received MDS information (see block 233). In one embodiment, the O-AUSF 209 invoked the temporary subscription credential provisioning if only a user info is provided and is eligible for temporary subscription. In another embodiment, the O-AUSF 209 invoked the actual subscription profile provisioning only if a provisioning server/subscription management function related URI/URL/address is received.

At Step 8$a$, e.g., using a service operation message, the O-AUSF 209 stores in a MNO NF 213 the received DIG-ID, verification result, a minimum data set (e.g., containing user information and MNO subscription provisioning related URI/URL/address) and the onboard root key (see messaging 235). The MNO NF 213 may be any NF in the MNO which stores the onboarding related user information, such as a UDM/UDR in the MNO.

In a first variant to support provisioning, the O-AUSF 209 may fetch a default subscription credential for the verified DIG-ID from the UDM/UDR and/or the MNO NF 213. Here, the default subscription credentials may include a SUPI (i.e., a user subscription identifier), AKA credentials, Slice information, MCC and MNC.

In a second variant to support provisioning, the O-AUSF 209 may fetch a user subscription profile for the verified DIG-ID from a provisioning server and/or subscription manager (depicted as provisioning server/subscription manager 215) by providing the MNO related information and user information received as part of the minimum data set. In the depicted example, the O-AUSF 209 fetches the user subscription profile via the MNO NF 213 (i.e., the UDM, see messaging 237); however, in other embodiments the O-AUSF 209 may fetch the user subscription profile for the verified DIG-ID directly from the provisioning sever 215. The user subscription profile may include a SUPI, AKA credentials, Slice information, MCC, MNC and network access related information which will enable the UE 205 to store as subscription profile in the UE 205 in a trusted secure location, such as a eUICC or non-UICC platform.

In a third variant to support UP based provisioning, after receiving the verified DIG-ID, verification result and MDS, the MNO NF 213 may invoke subscription fetching and activation process using the DIG-ID and MDS (for KYC, see messaging 237).

At Step 8$b$, the O-AUSF 209 derived the SEAF key (Kseaf) using the received Onboard root key, e.g., as CK', IK'/MSK/EMSK/Kausf in a KDF. The O-AUSF 209 sends to the NF 207 in the serving network a Response message which includes the verified DIG-ID, Kseaf and ID verification result (see messaging 239). Similar to step 2, the O-AUSF 209 may communicate with the NF 207 (e.g., an AMF) either directly or via another NF is the serving network, such as SEAF.

In certain embodiments, upon receiving the Response message, the SEAF in the serving network generates an AMF key (Kamf) from Kseaf and forwards the Response to AMF with DIG-ID and verification result containing success indication.

According to the first variant to support provisioning, the O-AUSF 209 may in addition send the default subscription credential for the verified DIG-ID along with the DIG-ID, a key derived from Onboard Root Key, and a nonce used to generate the key to the AMF/SEAF.

According to the second variant to support provisioning, the O-AUSF 209 may additionally send the user subscription profile for the verified DIG-ID along with the DIG-ID, a key derived from Onboard Root Key, and the nonce used to generate the key to the AMF/SEAF.

At Step 8$c$, the NF 207 (e.g., AMF) initiates the NAS and AS to set up the default security based on Kamf, upon receiving the DID, Kamf and success indication (see messaging 241). The control plane and user plane security may also be set up based on existing mechanism, e.g., using default selections of ciphering and integrity protection algorithms. Note that the UE 205 and NF 207 use the Onboard Root Key—or key(s) derived from it—to protect Provisioning. For example, the Onboard Root Key may be used as Kausf to establish NAS, AS and UP security. After Step 8c, the UE 205 will have security established with the MNO.

If the NF 207 receives an onboard container information with subscription credentials/user subscription profile, then it locally stores the onboard container information (e.g., at the AMF) along with the DIG-ID. The NF 207 may optionally receive a security key derived from the Onboard root key. Note that if no Kseaf is received, then no NAS security is established.

According to the third variant to support UP based provisioning, an RRC reconfiguration procedure may be run after the NAS and AS SMC to setup UP security. Here, the PDU session establishment may be restricted to the Provisioning server or subscription manager 215 (which may be located with MNO or, alternatively, located outside MNO network) based on the MDS information available in the UDM/UDR or preconfigured information.

The subscription credentials/profile provisioning may be triggered based on any of the following options.

According to a first Option, Control plane ("CP") based provisioning may be used to provide the UE with the subscription credentials/user subscription profile. Where the control plane solution is adopted, Step 9 is performed, and Step 10 is skipped.

In a first variant of the first Option, the CP provisioning connection is protected with NAS Security. Here, the AMF (e.g., NF 207) protects the Subscription credentials/user subscription profile along with the DIG-ID using the NAS key and sends in any N1 message to the UE 205.

In a second variant of the first Option, the CP provisioning connection is not protected with NAS Security. Here, the AMF (e.g., NF 207) protects the Subscription credentials/user subscription profile for the verified DID using the key provided by the O-AUSF 209 and derived from the onboard root key. At Step 9a, alternatively, in step 8c.

At Step 9a, the NF 207 (AMF) sends the onboard container with DIG-ID to the UE 205 in a response message over N1 (see messaging 245). In some embodiments, the N1 message is protected with NAS security to support Variant-1 of Option 1. Alternatively, the NF 207 (AMF) may send a protected onboard container with DIG-ID to the UE in a response message to support Variant-2 of Option 1. The protected onboard container is discussed in further detail below.

According to a second Option, the User plane ("UP") based provisioning may be used to provide the UE with the subscription credentials/user subscription profile. Where the control plane solution is adopted, Step 10 is performed, and Step 9 is skipped.

At Step 10, the UE 205 may be provisioned with the user subscription profile over the PDU session established with the provisioning server or subscription manager 215 (see messaging 247). A server which has the authorization to provision subscription information to the UE can be defined as a subscription manager. The subscription manager which has received the DIG-ID, verification result, lifetime and MDS in step 8a (in 237) can determine to facilitate provisioning of subscription to the UE if the DIG-ID verification result is success. Alternatively, if the MDS does not contain any MNO subscription related information, then the UE 205 may be prompted to buy or scan a QR code related to the MNO subscription.

Figure 3A:
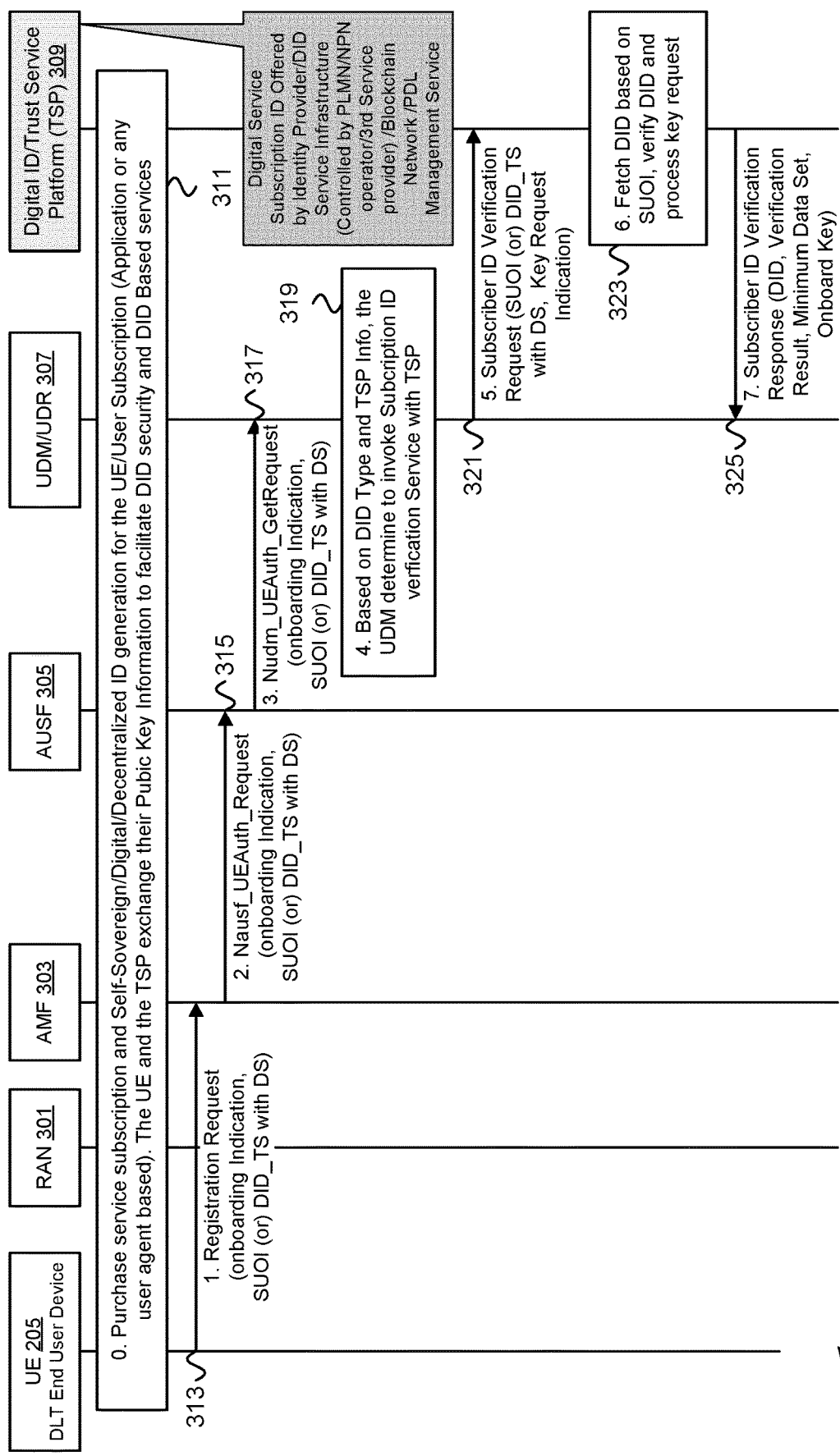
FIG. 3A is a diagram illustrating one embodiment of a procedure for Digital ID-based Onboarding for Network Access during a Registration Procedure.
Figure 3B:
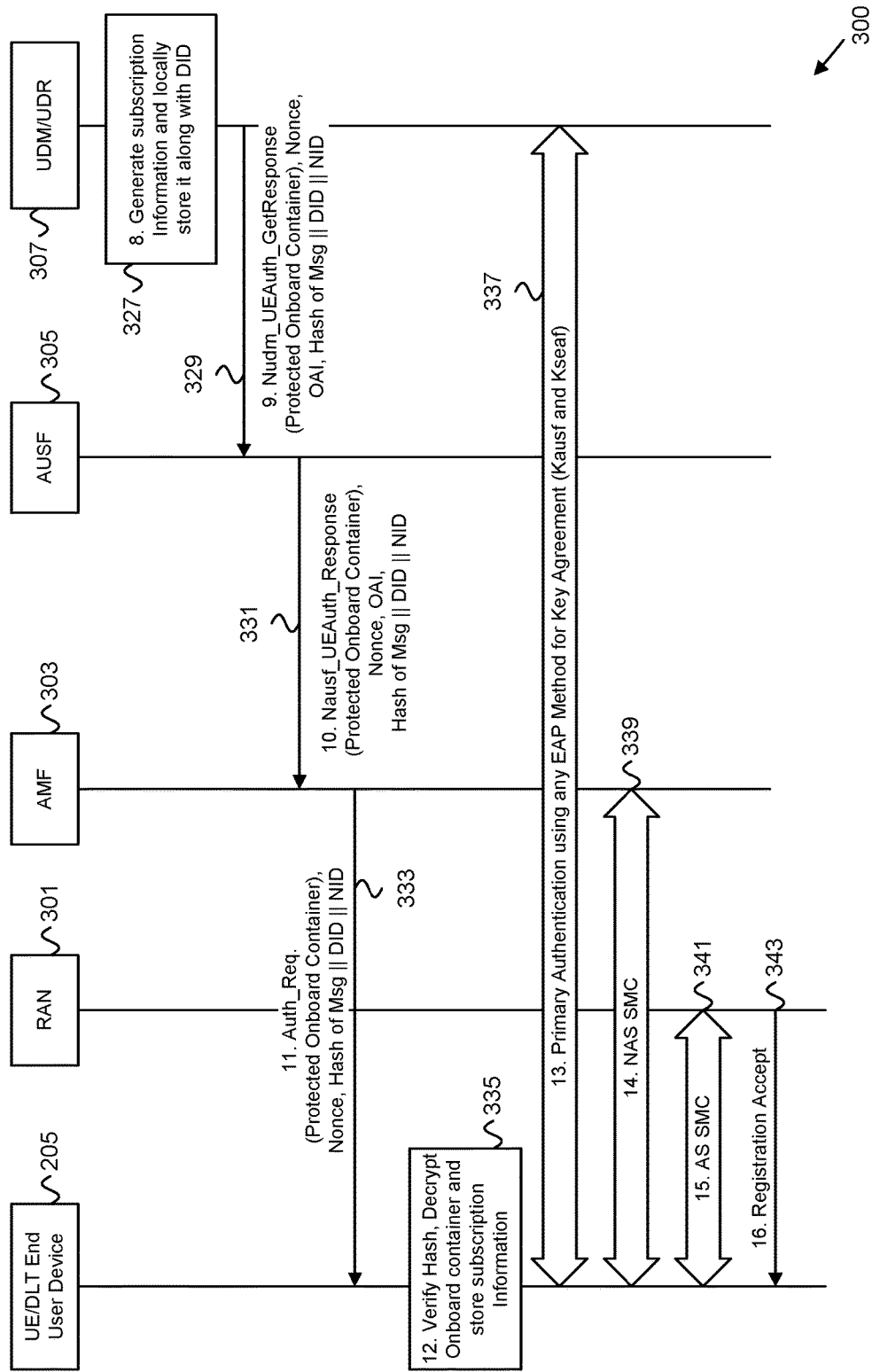
FIG. 3B is a continuation of the procedure in FIG. 3A.

FIG. 3A-3B illustrate a procedure 300 for DIG-ID-based Subscription Onboarding for Network Access during a Registration procedure, according to embodiments of the disclosure. The procedure 300 may be implemented using the UE 205, a RAN 301, an AMF 303, an AUSF 305, a UDM 307 and a Digital ID/Trust Service Platform 309. In various embodiments, the RAN 301 is one embodiment of the RAN 120, the AMF 303 is one embodiment of the AMF 132 and/or NF 207, the AUSF 305 is one embodiment of the O-AUSF 209 and/or AUSF 138, the UDM 307 is one embodiment of the UDM/UDR 139, and the Digital Identity/Trust Service Platform ("ID/TSP") 309 is one embodiment of the IDSP 142, TSP 143 and/or ID/TSP 211. The procedure 300 shows the detailed message exchange involved in the DIG-ID based subscriber onboarding and subscription provisioning during a Registration procedure. In the procedure 300 it is assumed that the UE 205 has no valid subscription profile on the UICC for the network access.

At Step 0, as the precondition the UE 205 (i.e., a device with any mobile application/user agent) buys a network/service subscription from the MNO or Service provider (see block 311). The service provider has a Service Level Agreement with the Identity service framework/Identity Service Providers and Trust service providers 309 to enable secured subscription onboarding via DIG-ID/DID validation. A User agent can be a program, such as a browser, mobile App, blockchain/DLT wallet or other Web client, that mediates the communication between holders (example. User/UE/device), issuers (example. Any Legal body/government/organization), and verifiers (e.g., Mobile Operator/Service provider/Identity providers/Trust service providers). The User agent may be one embodiment of the mobile application 107, described above.

The decentralized Identity service framework/Identity Service Providers and Trust service providers can be one or different parties, who facilitate DIG-ID/DID generation and secured linking, verification and storage of related verifiable credentials related to the user/device. The user/UE 205 then generates a DIG-ID/DID via the user agent based on the user preferences and/or service provider requirements (example with any set of attributes such as name, address, mobile number, age, Institutional/Legal Identifiers, documents, biometrics etc.) and submits the required verifiable credentials (such as Passport, Personal ID, Government ID documents, Driving license etc.) for the subscription/service activation through the user agent.

The DIG-ID/DID generated by the UE 205 through the user agent actually acts as a link/direct or indirect address to the related user public key storage (which can be used for verification of the digital signature of the digital ID created using the user's private key) and submitted verifiable credentials, where the submitted verifiable credentials can be verified and stored in a separate blockchain/Permissioned Distributed Ledger (PDL) by the Trust service provider/Identity Service provider in an Identity infrastructure/framework (example, Sovereign network/Sovereign ID framework or eIDAS framework). The identity/verifiable claims can be anonymously sealed on a blockchain and stored on a second permissioned and cryptographically secured distributed ledger.

The DIG-ID/DIDs are typically associated with cryptographic material, such as user public-private key pairs, ID/Trust service provider information (public key and public key identifier) and service endpoints, for establishing secure communication channels. User agent/application can be owned by the government/network operator/service provider/Trust service provider/Identity service provider framework.

The UE 205 will locally store in Trusted secure platform/ Smart Secure Platform/digital platform/memory/environment all cryptographic information along with the generated DIG-ID/DID. The cryptographic information can include the any Certificate (example ECDH)/user Public/private key pair, the verifier public key and public key ID, lifetime of the subscription, etc.

At step 0, the UE 205 has only made a successful online signup (i.e., service subscription payment, DIG-ID/DID generation and DIG-ID/DID linking to Verifiable credential submitted related to KYC for service activation) and UE 205 has generated a DIG-ID/DID. The UE 205 has a DIG-ID/DID available related to the required service and the UE 205 has no actual subscription information (example, IMSI/NAI, Authentication and Key agreement (AKA) credentials, Slice Information, etc.) to access the service.

In the depicted embodiment of FIGS. 3A-3B, the solution is explained taking the DID as the DIG-ID and the solution is described in terms of the DID. Note, however, that the same procedure and description are applicable to any DIG-ID such as SSI or Digital onboarding ID etc., in which case instead of DID, SSI/Onboarding ID can be replaced in the message flow and step description for any DIG-ID adaptability. Further, the procedure 300 can also be adopted to a scenario where the PLMN/NPN network operator performs DID user identity authentication via ID/Trust service provider Infrastructure/Decentralized ID Framework to trigger onboarding and provisioning of MNO's PLMN/NPN/$3^{rd}$ party service provider's subscription to the UE 205.

At Step 1, the UE 205 (which may be any mobile user equipment or IoT device) sends the registration request message to the AMF 303 (over a NAS message) which contains an onboarding indication and a Subscription Unique Onboarding ID (SUOI) (or) a DID with Time stamp (TS) and related digital signature (DS) of DID and Timestamp (see messaging 313).

Here, the UE 205 sends either
SUOI+Timestamp+Signature; or
DID+Timestamp+Signature; or
Concealed SUOI.

According to a first option (Option A), the UE 205 generates in step 0 a Digital ID (i.e., Decentralized ID/Self Sovereign ID/Digital Onboarding ID) and sends it in the registration request if an anonymity and integrity protection of DIG-ID is sufficient. Here, the Timestamp ("TS") is added in addition to the DID by the UE 205 while sending in the registration request. The combination of DID and TS is indicated "DID_TS." The timestamp is used by the UE 205 to prevent any attacker from reusing the cached DID for replay attack.

According to the first option, a digital signature for the DID_TS is created by the UE 205 to integrity protect the DID, along with the proof of possession of the private key by the credential owner (i.e., a UE/User). The methods of digital signature may include any mentioned below in Option B, Case 1. The DID, Timestamp and Digital signature of DID_TS is sent in the registration request to the network by the UE. In the depicted embodiment, the notation "DID_TS with DS" is used to indicate the Digital ID with Timestamp and Digital Signature generated by the Identity owner (i.e., the UE 205).

According to a second option (Option B), the UE 205 generates and uses a Subscriber Unique Onboarding Identifier ("SUOI") for onboarding in the registration request if a Digital ID/DID needs privacy protection by concealment.

Regarding the generation and usage of the SUOI, the UE 205 may construct a SUOI using the DID generated specific to the required service.

The SUOI can have any of the following formats:

SUOI Format 1: DIG-ID type/DID type, DIG-ID (i.e., Decentralized ID/Self Sovereign ID/Digital Onboarding ID), Service provider ID, Identity/Trust Service provider Information. Note that all the above information can be concatenated together. The DIG-ID/DID can also in addition contain any DIG-ID/DID related security information such as MAC of SUOI/Digital Signature of SUOI.

SUOI Format 2: DIG-ID (i.e., Decentralized ID/Self Sovereign ID/Digital Onboarding ID)@Service provider ID.Identity/Trust Service provider Information. Note that the DID can also in addition contain any DID related security information such as MAC of SUOI/Digital Signature of SUOI.

SUOI Format 3: Username='DIG-ID type_DIG-ID (i.e., Decentralized ID/Self Sovereign ID/Digital Onboarding ID)'@Realm='Service provider ID.Identity/Trust Service provider Information'. Where DIG-ID type can take indications to specify if it is a Decentralized ID/Self Sovereign DI/Digital Onboarding ID/and other Digital ID type. The DIG-ID can also in addition contain any DIG-ID related security information such as MAC of SUOI/Digital Signature of SUOI.

If the SUOI needs privacy, then the UE can send to AMF a protected SUOI/Concealed SUOI instead of SUOI using any of the following options:

Case 1: Digital Signature can be used for DIG-ID integrity protection. Here, the digital signature of the DIG-ID is generated by the UE and is used to prove the proof of possession of private key used to protect the DIG-ID. The scheme output will contain the digital signature of the DIG-ID. Note that as preconditions for Digital Signature Creation, the UE 205 and the Service Provider (e.g., MNO/TSP/IDP) have Certificate(s) to support PKI (example X.509, Card Verifiable Certificate, etc.). During online Sign up with a Service Provider (i.e., a service provider can be an MNO or a $3^{rd}$ party), UEs are provided certificates with a signed public key for the network in which they are allowed to connect. The TSP (Trusted Service Provider) 309 would likewise be provided with certificates of eligible UEs.

In one embodiment, each Service Provider has a public and private key pair (sp_PUB_Key, sp_PRI_Key). In one embodiment, UEs have a corresponding public and private key pair (UE_PUB_Key, UE_PRI_Key). In one embodiment, each Service Provider shares its public key (sp_PUB_Key) with a certificate with all UEs. In one embodiment, UEs share their public keys (UE_PUB_Key) with a certificate with the Service Provider.

Optionally, if there is a different network operator who need to provide access to Service provider's subscribers then Network Operator can be provisioned with the same sp_PRI_Key. In another embodiment, the UEs and Service Providers create a message digest by applying a hashing algorithm to the SUOI. In another embodiment, the UE and Service Providers encrypt the message digest with the core network UE_PRI_Key which become the signature. In one embodiment, the signature is appended to the Actual Message (i.e., SUOI).

Alternatively, a shared secret key may be used to generate the MAC tag of the DIG-ID. The scheme output will contain the MAC tag of the DIG-ID. Note that the SUOI may support a Concealed-SUOI format, comprising: DIG-ID Indication, DIG-ID, Service Provider/Identity Service Provider/TSP ID and the related public key ID, Protection Scheme ID, Scheme Output.

Case 2: Shared Secret Key used for DIG-ID protection similar to SUCI protection in 5G. Here, the UE can use the shared secret key derived based on the ID/TSP public key to encrypt the SUOI and the corresponding ID/TSP public key ID is sent by the UE along with the concealed SUOI to enable the ID/TSP to de-conceal the concealed SUOI to SUOI and verify the SUOI accordingly. Note that Case 2 also supports a Concealed-SUOI format, comprising: DIG-ID Indication, Service Provider/Identity Provider/TSP ID, Protection Scheme ID, SP/IP/TSP Public key ID, Scheme Output with Ephemeral Public Key.

Note that if a DID is used as DIG-ID, then the DIG-ID/DID Information can include any DID syntax-based information from, e.g., W3C Working Draft of DIDs. For example: URI scheme identifier (did), Identifier for the DID method, DID method-specific identifier.

At Step 2, the AMF 303 sends the authentication request message (i.e., Nausf_UEAuth_Request) to the AUSF 305 with the Onboarding indication and received SUOI (or concealed SUOI)/DID_TS with DS (see messaging 315).

At Step 3, on receiving an onboarding indication with DID based plain text/concealed SUOI/DID_TS with DS, the AUSF 305 sends an authentication data request message (i.e., Nudm_UEAuth_Request) to the UDM 307 with the received Onboarding indication and SUOI, alternatively Concealed SUOI, alternatively DID_TS with DS (see messaging 317).

In one alternative, the AUSF 305—on receiving an onboarding indication with DID based plain text/concealed SUOI/DID_TS with DS—sends an authentication/onboarding data request message to the Provisioning Server with the received Onboarding indication and SUOI (or concealed SUOI)/DID_TS with DS. One example of an authentication/onboarding data request message is the service operation message Npserver_UEAuth_GetRequest. Another example of an authentication/onboarding data request message is the service operation message Npserver_UESubscriptionProvisioing_Request.

At Step 4, based on the DID type and/or service provider information, the UDM 307 can determine to invoke verification of DID through the ID Service/Trust service provider who manages/controls the DID and related DID documents (verifiable user/device credentials). Alternatively, based on the DID type, the Provisioning Server can determine to invoke verification of DID through the ID Service/Trust service provider who manages/controls the DID and related DID documents (verifiable user/device credentials).

At Step 5, based on the ID Service Provider information and/or Trust service provider information present in the DID or SUOI/concealed SUOI, the UDM 307 selects the ID/TSP 309 and sends a subscriber ID verification request message with the received SUOI/DID/Concealed DID along with a Key request indication to the ID/TSP 309. The message may contain additional information request indication about the subscriber/user, e.g., name, address, day of birth, bank account, etc. in order to generate a full subscription profile and to meet KYC requirements. The ID Service provider and/or Trust service provider can together form a Digital Identity Service platform.

Alternatively, based on the ID Service/Trust service provider information present in the DID or SUOI/concealed SUOI/DID_TS with DS, the Provisioning Server 215 sends a subscriber ID verification request message with the received SUOI/DID/Concealed DID/DID_TS with DS along with a Key request indication to the ID/TSP 309.

Alternatively, if the UDM 307 and/or Provisioning Server 215 receives a DID_TS with DS, it invokes an ID verification request with a decentralized ID framework using the DID_TS with DS to verify DID and/or fetch the ID/Trust service provider information. Based on the ID/TSP 309 address information received, the UDM/provisioning server sends a subscriber ID verification request message with the received DID_TS with DS along with a Key request indication to the ID/TSP 309.

At Step 6, on receiving a SUOI/concealed SUOI/DID_TS with DS, the ID/TSP 309 verifies the DID based on a universal resolver or local database information which stores the association of the DID and the address of the DID documents storage in a Blockchain/PDL. The ID/TSP 309 verifies the validity, scope of DID usage (scope refers to the usage information related to the DID which clarifies the purpose for which the DID can be used by the user/network) and authenticity of the DID by fetching the DID information and user documents (verifiable credentials).

If any NF (here the UDM 307, or it can also be a subscription provisioning server/onboarding server) from service provider/MNO domain requests any subscriber related information, then the ID/TSP 309 generates a Minimum data set with all required subscription information about the subscriber/user (a minimum data set for example can contain subscriber name, location, DID validity, service payment info, service activation status, etc.).

In addition, if the service provider/MNO domain also requests any security key request to protect the subscription onboarding, then the ID/TSP 309 derives the Onboarding Root key ($K_{ONB\_Root}$) based on the security credentials available (example: a public/private key pair and a shared secret key) in the UE 205. An example derivation of the Onboarding Root key ($K_{ONB\_Root}$) using the MNO ID is as follows:

$$K_{ONB\_Root}=\text{KDF}(\text{Shared Secret Key},\text{MNO ID}) \quad \text{Equation 1}$$

where KDF represents a key derivation function having as its inputs the shared secret key and the MNO Identifier.

An example derivation of the Onboarding Root key ($K_{ONB\_Root}$) using the Service provider ID is as follows:

$$K_{ONB\_Root}=\text{KDF}(\text{Shared Secret Key},\text{Service provider ID}) \quad \text{Equation 2}$$

where KDF represents a key derivation function having as its inputs the shared secret key and the Service Provider Identifier.

Alternatively, if the ID/TSP 309 309 receives a DID_TS with DS, the public key associated to the DID stored along with the DID documents is fetched to verify the digital signature received along with the DID_TS. If the verification is successful, then DID authentication is considered as successful and the related DID information can be fetched by the ID/TSP 309 to process the MNO/service provider's ID verification and key request.

However, if the timestamp received in DID_TS is not same as the one used in digital signature creation, then the ID/TSP 309 identifies that a time stamp has been tampered by the attackers or if the time stamp is an obsolete time, then it is classified as a replay attack.

Alternatively, if the ID/TSP 309 receives a concealed SUOI/DID instead of a plaintext SUOI, the concealed SUOI is de-concealed using the private key related to the public key indicated by the public key ID. The rest of the process involved in the validation of DID fetched from SUOI, minimum data set generation and onboarding key generation will be same as described above.

Regarding the method of Digital Signature Verification, if the digital signature is applied for a SUOI/DID_TS, then at the service provider side, the service provider should use the corresponding UE_PUB_Key to verify the signature of SUOI/DID_TS. If the signature is successfully verified, Service provider can accept the messages; otherwise, the messages are discarded and the verification result will be set to failure in step 7.

At Step 7, the ID/TSP 309 309 sends to the UDM 307 (or a NF in service provider domain) a subscriber ID verification response message containing verified DID, DID verification result (Success or Failure), Minimum data set with subscriber/user information and Onboard Root Key ($K_{ONB\_Root}$) (see messaging 325). The Onboard Root Key is also referred to as the onboard key.

Alternatively, the ID/TSP 309 309 sends to the Provisioning Server (or a NF in service provider domain) a subscriber ID verification response message containing verified DID, DID verification result (Success or Failure), Minimum data set with user information and Onboard Root Key ($K_{ONB\_Root}$).

Continuing on FIG. 3B, at Step 8, if the UDM 307 receives the DID verification result as 'success', then the UDM 307 generates subscription information and stores it along with the received information such verified DID, DID verification result (Success or Failure), Minimum data set with user information and Onboard Root Key ($K_{ONB\_Root}$) in the UDR (see block 327). However, if the UDM 307 receives the DID verification result as 'failure', then the UDM 307 stores the received information such verified DID, DID verification result (Failure) in the UDR.

When the DID verification is successful, then the UDM 307 further generates a nonce and derives an Onboarding Security Key ($K_{ONB\_Sec}$) from the received Onboard Root key using nonce as the input in key derivation as follows:

$$K_{ONB\_Sec}=KDF(K_{ONB\_Root}, MNO/\text{Service provider ID}, Nonce) \quad \text{Equation 3}$$

where KDF represents a key derivation function having as its inputs the shared secret key and the MNO ID.

The $K_{ONB\_Sec}$ is used to confidentiality and integrity protect the onboard container containing the User subscription information provisioned to the UE, e.g., by deriving an Onboarding encryption key ($K_{ONB\_enc}$) and an Onboarding integrity ($K_{ONB\_int}$) key as follows:

$$K_{ONB\_enc}=KDF(K_{ONB\_Sec}, MNO/\text{Service provider ID}, \text{'Ciphering algorithm ID,'`DID,'keyword:`Subscription Onboarding'}) \quad \text{Equation 4}$$

$$K_{ONB\_int}=KDF(K_{ONB\_Sec}, MNO/\text{Service provider ID}, \text{'Integrity algorithm ID,'`DID,'keyword:`Subscription Onboarding'}) \quad \text{Equation 5}$$

The Onboard Container is to include: K, SUPI/IMSI, AKA credentials, Security Capabilities (Authentication Method, Security Algorithm Capability), Slice Subscription Information, mobile operator public key for SUPI concealment and any other User/Service Subscription Information. The UDM 307 either fetches UE subscription information from the Provisioning server or generates UE subscription information locally. The UDM 307 further constructs an onboard container with the new user subscription information (K, IMSI, AKA credentials, SUCI generation inputs, Routing ID, Slice subscription information, Security information etc.) and encrypts the onboard container with the Key $K_{ONB\_enc}$.

The UDM 307 generates the MAC of the onboard container together with an onboard assistance information ("OAI") information element ("IE") using the integrity key $K_{ONB\_int}$ to integrity protect the subscription information and related information sent to the UE. The OAI IE contains information on onboard result with 'success indication,' security algorithms and IDs used to identify the ciphering and integrity protection algorithms used to protect the onboard container (i.e., user subscription information) and related information.

Alternatively, the onboarding security keys can be derived from Onboard Root Key ($K_{ONB\_Root}$) using the new nonce as input and the onboarding security keys can be used to protect the subscription information related to subscription onboarding.

$$K_{ONB\_enc}=KDF(K_{ONB\_Root}, MNO/\text{Service provider ID}, Nonce, \text{'Ciphering algorithm ID,'`DID,'keyword:`Subscription Onboarding'}) \quad \text{Equation 6}$$

$$K_{ONB\_int}=KDF(K_{ONB\_Root}, MNO/\text{Service provider ID}, Nonce, \text{'Integrity algorithm ID,'`DID,'keyword:`Subscription Onboarding'}) \quad \text{Equation 7}$$

Alternatively, all the above processing specified for step 8 will be carried out by the provisioning server if the provisioning server is involved in the subscription onboarding procedure instead of a UDM 307.

Alternatively, the UDM 307 stores the key K in the ARPF as the new root key for the subscription. The UDM 307 based on the DID/SUPI selects an authentication method and CK'/IK' (or) $K_{AUSF}$ may be derived from the key K as per normal specification and provisioned to the AUSF along with the authentication vector (AUTN, RAND and keys) if the UDM 307 determines to perform primary authentication along with the subscription provisioning/at the next full authentication run based on the new credentials.

At Step 9, the UDM 307 sends the protected Onboard Container with encrypted subscription information along with Nonce, OAI and MAC to the AUSF 305 (see messaging 329). In the depicted example, the MAC is generated by using a hash function to hash the string: onboard container∥Nonce∥OAI∥DID∥MNO/Service provider ID. Here, the symbol "∥" is used to show concatenation. In certain embodiments, the UDM 307 sends the protected Onboard Container in the Nudm_UEAuth_GetResponse message.

Alternatively, the provisioning server may send the protected Onboard Container with encrypted subscription information along with Nonce, OAI and MAC (i.e., Hash of onboard container∥Nonce∥OAI∥DID∥MNO/Service provider ID) to the AUSF 305 in an authentication/onboarding data response message, e.g., using the service operation message Npserver_UEAuth_GetResponse and/or Npserver_UESubscriptionProvisioing_Response.

Alternatively, the UDM 307 may sends a plaintext Onboard Container along with 'Required NAS Protection Indication' included as part of OAI along with Onboard Security Context (($K_{ONB\_Root}$)/($K_{ONB\_enc}$, $K_{ONB\_int}$)) and Nonce to the AUSF. In certain embodiments, the UDM 307 sends an authentication vector along with the Onboard Container in Nudm_UEAuth_Get Response message to the AUSF which enables the UE to continue primary authentication soon after fetching the subscription information from the Onboard Container.

At Step 10, the AUSF 305 forwards the received protected Onboard Container with encrypted subscription information along with Nonce, OAI and MAC (i.e., Hash of onboard container‖Nonce‖OAI‖DID‖MNO/Service provider ID) to the AMF 303 in a service operation message, e.g., Nudm_UEAuth_Response.

Alternatively, the AUSF 305 may forward the received plaintext Onboard Container along with 'Required NAS Protection Indication' included as part of OAI along with Onboard Security Context (($K_{ONB\_Root}$)/($K_{ONB\_enc}$, $K_{ONB\_int}$)) and Nonce to the AMF 303.

Optionally, the AUSF 305 may also send an authentication challenge and RAND along with the Onboard Container (protected or plaintext) to the AMF 303 which enables the UE 205 to continue primary authentication soon after fetching the subscription information from the onboard container.

At Step 11, the AMF 303 sends the received protected onboarding container with encrypted subscription information along with Nonce, OAI and MAC (i.e., Hash of onboard container‖Nonce‖OAI‖DID‖MNO/Service provider ID) to the UE 205 over the NAS transport/message in the Auth_Response message.

Alternatively, the AMF 303 receives the plain text onboarding container with Nonce, Onboard Security Context (($K_{ONB\_Root}$)/($K_{ONB\_enc}$, $K_{ONB\_int}$)) and OAI with NAS Protection Indication. If the AMF 303 receives Onboard root key as the Onboard Security Context, then the AMF 303 derives the $K_{ONB\_enc}$ and $K_{ONB\_int}$ keys. Then the AMF 303 applies confidentiality and integrity protection to the onboard container using the Onboard Security Context ($K_{ONB\_enc}$, $K_{ONB\_int}$). The AMF 303 encrypts the onboard container with the Key $K_{ONB\_enc}$ and generates the MAC of the onboard container together with the OAI IE using the integrity key $K_{ONB\_int}$ to integrity protect the subscription information. $K_{ONB\_enc}$ may be derived according to Equation 6, above, while $K_{ONB\_int}$ may be derived according to Equation 7, above.

The AMF 303 then sends the protected onboarding container with encrypted subscription information along with Nonce, OAI and MAC (i.e., Hash of onboard container-‖Nonce‖OAI‖DID‖MNO/Service provider ID) to the UE 205 over the NAS transport/message in the Auth_Response message. The OAI IE may contain information on onboard result with the received 'success indication', security algorithm IDs used and used to identify the ciphering and integrity protection algorithms used to protect the onboard container (i.e., user subscription information) and Required NAS Protection Indication'.

Alternatively, the AMF 303 may also send the authentication challenge and RAND along with Onboard Container to the UE 205, which enables the UE 205 to continue primary authentication soon after fetching the subscription information from the onboard container.

Alternatively, the AMF 303 sends a Registration Reject to the UE 205 including the protected onboarding container and Onboard/onboard authentication success indication. The Reject message may have an indication that the UE 205 is to re-register using the credentials provisioned in the onboarding container.

Step 12, upon receiving the OAI with onboard result with 'success indication', the UE 205 may use the received nonce and locally available shared secret key related to the DID, to generate the onboarding security context such as $K_{ONB\_Root}$, $K_{ONB\_Sec}$, $K_{ONB\_enc}$, $K_{ONB\_int}$ Keys based on the implementation similar to the UDM 307/provisioning server. The UE 205 uses $K_{ONB\_enc}$ to decrypt the onboard container and uses $K_{ONB\_int}$ to generate a MAC and verifies if the computed MAC is same as the received MAC to check the integrity of the onboard container, Nonce and OAI information. If the MAC verification is successful, the UE 205 locally stores the received subscription information in the trusted storage to use it for the subsequent network/service access.

The subscription information received in the onboard container may include one or more of the following information:

K, SUPI/IMSI, AKA credentials, Security Capabilities (Authentication Method, Security Algorithm Capability), Slice Subscription Information, any other User/Service Subscription Information, etc.

Alternatively, if the UE 205 receives, 'Required NAS Protection Indication' as part of the OAI, then the UE 205 understands that, the Onboard container is protected at the NAS level and the UE 205 can verify the integrity and decrypt the onboard container based on the OAI information received, as described in step 12.

Alternatively, if the UE 205 receives a Registration Reject with a protected onboarding container with Onboard/onboard authentication success indication, the UE 205 may derive the onboarding keys as described before and then decrypt and verify the onboarding container. The UE 205 generates a fresh SUCI and sends an Initial Registration based on the received subscription profile in the onboarding container. The UE 205 may store the subscription profile in a new USIM profile or updates an existing USIM profile.

Alternatively, if the UE 205 received an authentication challenge and RAND along with Onboard Container, after the successful subscription reception, the UE 205 continues exchange of authentication challenge response with the network to continue primary authentication.

At Step 13, the UE 205 may initiate a Registration Request (Initial Registration) to the AMF 303 based on the received subscription information and a primary authentication can be performed. If the primary authentication is successful, the UE 205 may derive the Kausf as specified in 3GPP TS 33.501. Here, the newly derived Kausf replaces the previously derived Kausf which was based on the Onboard root key.

At Step 14, the AMF 303 initiates NAS SMC to set up NAS security and then the AMF 303 triggers to initiate a UE initial context set up with the gNB in the RAN 301.

At Step 15, the gNB (in RAN 301) initiates and performs AS SMC to set up AS security context.

At Step 16, after a successful AS security set up, a protected Registration Accept message is sent to the UE 205.

Figure 4A:
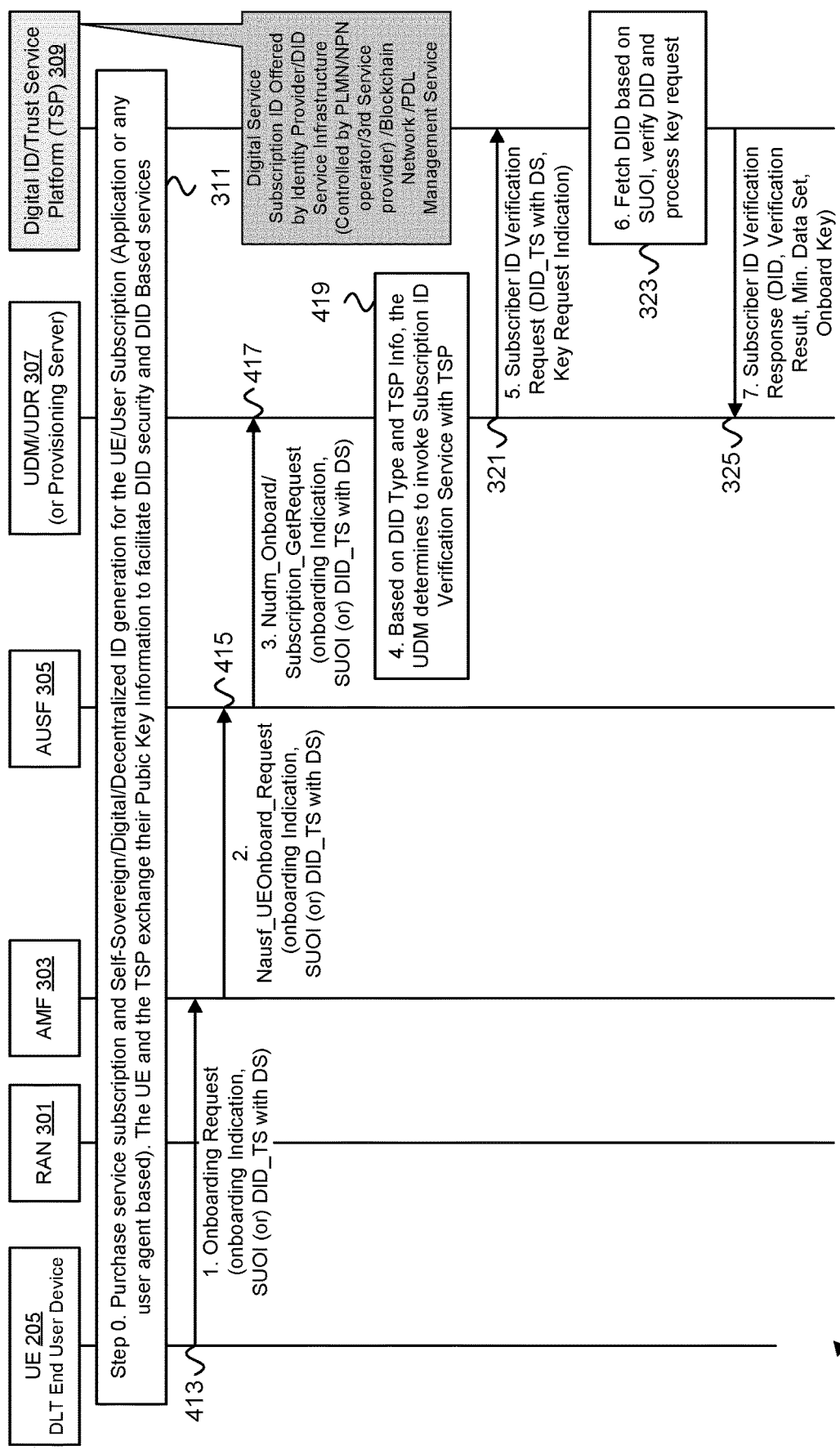
FIG. 4A is a diagram illustrating one embodiment of a procedure for Digital ID-based Onboarding for Network Access during using an Onboarding Procedure.
Figure 4B:
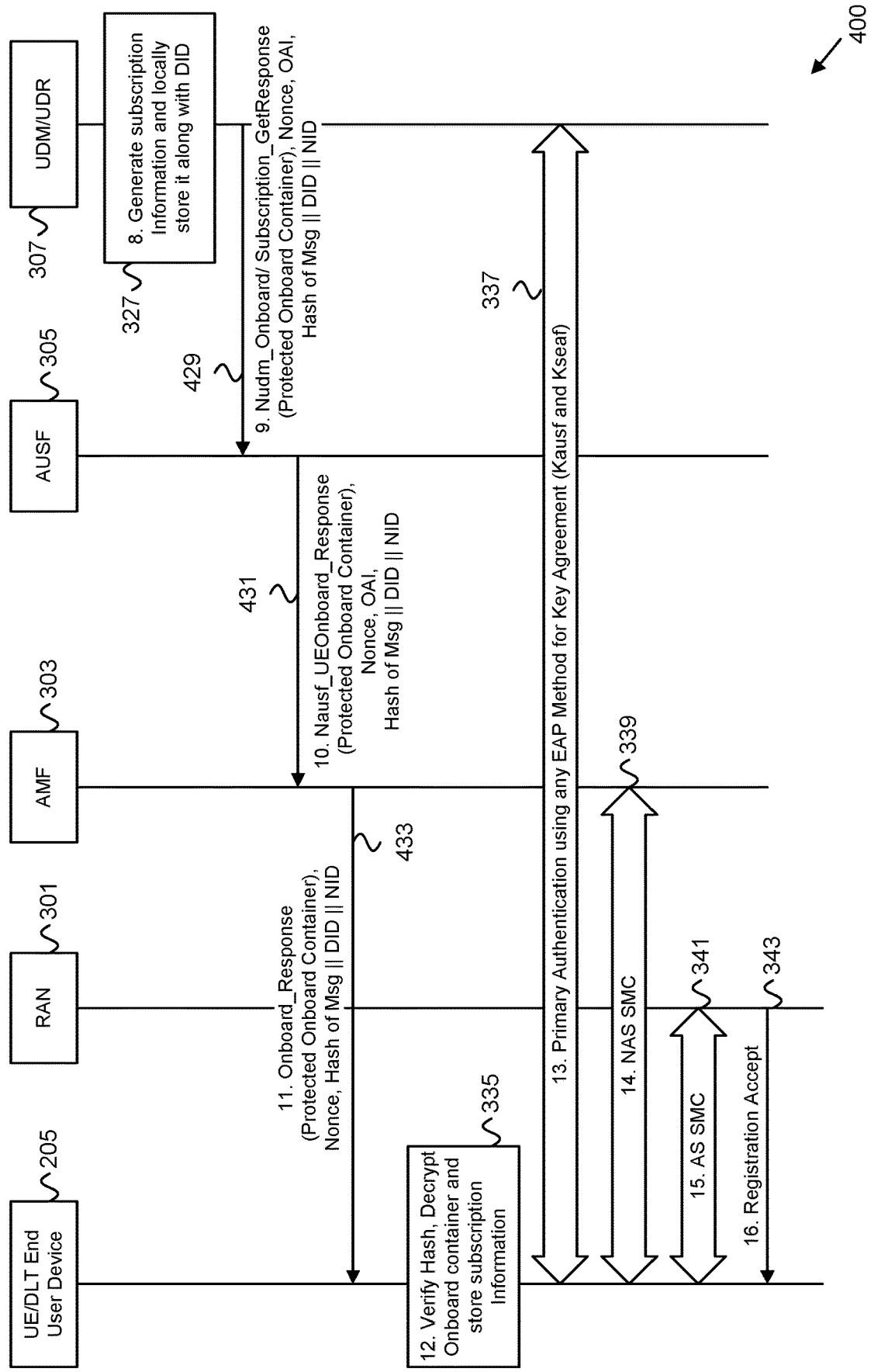
FIG. 4B is a continuation of the procedure in FIG. 4A.

FIG. 4A-4B illustrate a procedure 400 for DIG-ID-based Subscription Onboarding for Network Access during an Onboarding procedure, according to embodiments of the disclosure. The procedure 400 may be implemented using the UE 205, the RAN 301, the AMF 303, the AUSF 305, the UDM/UDR 307 and the Digital ID/Trust Service Platform ("ID/TSP") 309. The procedure 400 represents an alternative subscription onboarding procedure to the procedure 300, primarily due to the procedure 400 using a 5G Onboarding Procedure/instead of using a Registration procedure.

For brevity, the procedure 400 is assumed to be the same as the procedure 300 with the following differences mainly on the Onboarding related service operations messages used to carry exchange the onboarding message in the 5G System. Therefore, the following description provided below extends similar steps described above with changes required in relation to the 5G onboarding procedure.

Step 0 (see block 311) is substantially as described above with reference to FIG. 3A.

At Step 1, the UE 205 (which can be any mobile user equipment or IoT device) constructs a Subscription Unique Onboarding ID ("SUOI") using the DID generated specific to the required service. The SUOI may be constructed as described above with reference to FIG. 3A. Alternatively, the UE 205 may generate a DID, Timestamp, and Digital Signature ("DS") of the DID/Timestamp combination (denoted "DID_TS"). Here, the UE 205 sends an Onboarding Request message to the AMF 303 (over a N1/NAS interface) which contains a subscription onboarding indication and SUOI (alternatively, a concealed SUOI) or DID_TS with DS (see messaging 413).

At Step 2, the AMF 303 forwards the Onboarding Request message to the AUSF 305 with a subscription onboarding indication and received SUOI (alternatively, concealed SUOI) or DID_TS with DS (see messaging 415). In some embodiments, the AMF 303 uses the service operation message, i.e., Nausf_UEOnboard_Request to forward the received Onboarding Request.

At Step 3, upon receiving a subscription onboarding indication with DID based plaintext/concealed SUOI or DID_TS with DS, the AUSF 305 sends an authentication/onboarding data request message to the UDM/UDR 307 with the received subscription Onboarding indication and SUOI (or concealed SUOI), alternatively, DID_TS with DS (see messaging 407). In one embodiment, the AUSF 305 uses the service operation message Nudm_UEOnboard_Request to send the authentication/onboarding data request message. In another embodiment, the AUSF 305 uses the service operation message Nudm_Subscription_GetRequest to send the authentication/onboarding data request message.

Alternatively, upon receiving a subscription onboarding indication with DID based plaintext/concealed SUOI or DID_TS with DS, the AUSF 305 sends an authentication/onboarding data request message to the Provisioning Server with the received subscription Onboarding indication and SUOI (or concealed SUOI), alternatively, DID_TS with DS. In one embodiment, the AUSF 305 uses the service operation message Npserver_UEOnboard_GetRequest to send the authentication/onboarding data request message. In another embodiment, the AUSF 305 uses the service operation message Npserver_UESubscriptionProvisioing_Request to send the authentication/onboarding data request message.

At Step 4, based on the DID type and subscription onboarding indication, the UDM/UDR 307 may determine to invoke verification of DID through the ID Service/Trust service provider 309, who manages/controls the DID and related DID documents (verifiable user/device credentials).

Alternatively, based on the DID type and subscription onboarding indication, the Provisioning Server can determine to invoke verification of DID through the ID Service/Trust service provider who manages/controls the DID and related DID documents (verifiable user/device credentials).

Step 5-7 are substantially as described above with reference to FIG. 3A (see messaging 321, block 323, and messaging 325).

Continuing on FIG. 4B, Step 8 is substantially as described above with reference to FIG. 4B (see block 327).

At Step 9, the UDM/UDR 307 sends the protected onboarding container with encrypted subscription information along with Nonce, OAI and MAC (i.e., Hash of onboard container||Nonce||OAI||DID||MNO/Service provider ID) to the AUSF 305 in an authentication or onboarding data response message (see messaging 429). In one embodiment, the UDM/UDR 307 uses the service operation message Nudm_UEOnboard_Response to send the protected onboarding container. Alternatively, the UDM/UDR 307 uses the service operation message Nudm_Subscription_GetResponse to send the protected onboarding container.

Alternatively, the provisioning server may send the protected onboarding container with encrypted subscription information along with Nonce, OAI and MAC (Hash of onboard container||Nonce||OAI||DID||MNO/Service provider ID) to the AUSF 305 in an authentication or onboarding data response message. In one embodiment, the Provisioning server uses the service operation message Npserver_UEOnboard_GetResponse to send the protected onboarding container. Alternatively, the Provisioning server may use the service operation message Npserver_UESubscriptionProvisioing_Response message to send the protected onboarding container.

Alternatively, the UDM 307 and/or Provisioning server may send the subscription information along with Nonce, Onboard Security Context (($K_{ONB\_Root}$)/($K_{ONB\_enc}$, $K_{ONB\_int}$)) and OAI to the AUSF 305 in an authentication/onboarding data response message, for example in one of service operation messages Nudm_UEOnboard_Response, Nudm_Subscription_GetRequest, Npserver_UEOnboard_GetResponse, and/or Npserver_UESubscriptionProvisioing_Response message.

At Step 10, the AUSF 305 forwards the received protected onboarding container with encrypted subscription information along with Nonce, OAI and MAC (i.e., Hash of onboard container||Nonce||OAI||DID||MNO/Service provider ID) to the AMF 303, e.g., in the Nudm_UEOnboard_Response message (see messaging 425).

Alternatively, the AUSF 305 forwards the received unprotected onboarding container with plain text subscription information along with Nonce, Onboard Security Context (($K_{ONB\_Root}$)/($K_{ONB\_enc}$, $K_{ONB\_int}$)) and OAI to the AMF 303 in the Nudm_UEOnboard_Response message.

At Step 11, the AMF 303 sends the received protected onboarding container with encrypted subscription information along with Nonce, OAI and MAC (i.e., Hash of onboard container||Nonce||OAI||DID||MNO/Service provider ID) to the UE 205 over the NAS transport/message in the Onboard_Response message (see messaging 433).

Alternatively, the AMF 303 applies confidentiality and integrity protection to the received onboarding container and sends the encrypted subscription information along with Nonce, OAI and MAC (i.e., Hash of onboard container-||Nonce||OAI||DID||MNO/Service provider ID) to the UE over the NAS transport/message in the Onboard_Response message.

Step 12-16 are substantially as described above with reference to FIG. 3B (see block 335, messaging 337, messaging 339, messaging 341 and messaging 343).

Note that the procedure 400 may also be adopted to a scenario where the PLMN/NPN network operator performs DID user identity authentication via ID/Trust service provider Infrastructure/Decentralized ID Framework to trigger onboarding and provisioning of MNO's PLMN/NPN/3$^{rd}$ party service provider's subscription to the UE 205.

Figure 5:
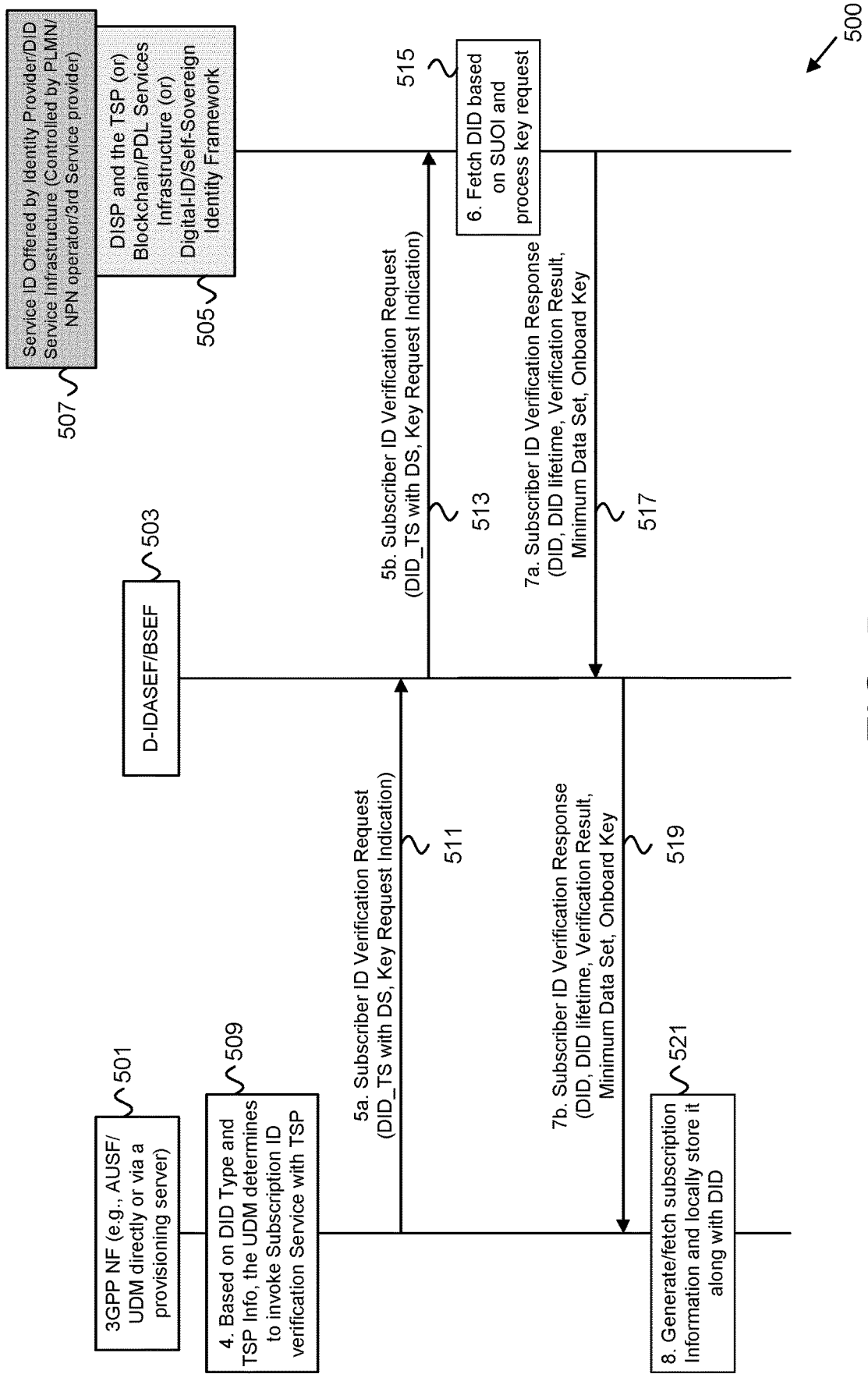
FIG. 5 is a diagram illustrating one embodiment of a procedure for Digital-ID-based Onboarding via a Service Enabler Function to enable DIG-ID-based identification, authentication, and trust service.

FIG. 5 illustrates a procedure 500 for DIG-ID-based Onboarding via a Service Enabler Function to enable DIG-ID-based identification, authentication, and trust service, according to embodiments of the disclosure. The procedure 500 represents an alternative subscription onboarding procedure to the procedures 300 and 400.

For brevity, the procedure 500 is assumed to begin after Step 3 of FIG. 3A and replaces Step 4 through Step 8 of the procedure 300. Alternatively, the procedure 500 may begin after Step 3 of FIG. 4A and replaces Step 4 through Step 8 of the procedure 400. The following DID verification and key request procedure shown in FIG. 5 may be used to enable a 3GPP network function ("NF") 501 (such AUSF and/or UDM and/or provisioning server) to communicate with the external identity framework 505 via a Digital Identification, Authentication and trust Services Enabler Function ("D-IDASEF") or Blockchain Service Enabler Function ("BSEF") (collectively referred to as "D-IDASEF/ BSEF" 503) to perform the DID based ID verification, and authentication to enable subscription provisioning to the appropriate UE. The D-IDASEF/BSEF 503 is a new 3GPP network function which can either belong to a mobile network operator or service provider domain. In certain embodiments, the D-IDASEF/BSEF 503 performs AAA-proxy functions. Note that the D-IDASEF/BSEF 503 may be embodiments of the D-IDASEF 137 and/or the BSEF 138.

The external identity framework 505 may comprise an Identity Service Provider and/or Trust Service Provider ("TSP"), for example the ID/TSP 211 and/or ID/TSP 309. As mentioned above, the ID/Trust service provider can together form a Digital Identity Service platform ("DISP"). In some embodiments, the identity framework 505 includes Blockchain services infrastructure (e.g., BSI 144) and/or Permissioned Distributed Ledger ("PDL") services infrastructure. In some embodiments, the identity framework 505 includes a Digital-ID framework, a Decentralized-ID framework, and/or a Self-Sovereign ID framework.

In various embodiments, the identify framework 505 is associated with a Service ID 507 that is offered by an Identity Provider and/or DID Service Infrastructure controlled by a PLMN or NPN operator. Alternatively, the infrastructure offering the Service ID 507 may be controlled by a third-party service provider.

The identify framework 505 may be located outside the 3GPP network, e.g., if the blockchain/PDL services Infrastructure is managed by a third-party service provider. In such embodiments, the DIG-ID (e.g., a DID or SSI) may be stored in the blockchain or PDL (e.g., the blockchain and/or distributed ledger network 160). In other embodiments, the identity framework 505 may be managed by the MNO or service provider in the 3GPP network. Note that the 3GPP NF 501 and D-IDASEF/BSEF 503 are located in the 3GPP network. The AUSF/UDM may communicate directly with the D-IDASEF/BSEF 503, or may communicate with the D-IDASEF/BSEF 503 via a provisioning server (such as the Provisioning server 215).

The procedure 500 begins with Step 4, where—based on the DID type and ID/Trust service provider ID (i.e., a domain name)—the 3GPP NF 501 (e.g., AUSF/UDM) may determine to invoke verification of DID through the ID Service/Trust service provider who manages/controls the DID and related DID documents (verifiable user/device credentials) (see block 509). Alternatively, based on the DID type and ID/Trust service provider ID (i.e., a domain name), the provisioning server (as 3GPP NF 501) may determine to invoke verification of DID through the ID Service/Trust service provider who manages/controls the DID and related DID documents (verifiable user/device credentials).

At Step 5a, based on the ID Service/Trust service provider information present in the DID or SUOI/concealed SUOI, the 3GPP NF 501 (e.g., AUSF/UDM) sends a subscriber ID verification request message with the received SUOI/DID/ Concealed DID/DID_TS with DS along with a Key request indication to the D-IDASEF/BSEF 503 (see messaging 511). Alternatively, based on the ID Service/Trust service provider information present in the DID or SUOI/concealed SUOI, the Provisioning Server sends a subscriber ID verification request message with the received SUOI/DID/Concealed DID/DID_TS with DS along with a Key request indication to the D-IDASEF/BSEF 503.

At Step 5b, based on the ID Service/Trust service provider information present in the DID or SUOI/concealed SUOI, the D-IDASEF/BSEF 503 forwards the received subscriber ID verification request message with the received SUOI/ DID/Concealed DID/DID_TS with DS along with a Key request indication to the identity framework 505 (see messaging 513).

At Step 6, the identity framework 505 (e.g., ID/TSP) on receiving a SUOI/DID/DID TS with DS verifies the DID based on a universal resolver or local database information which stores the association of the DID and the address of the DID documents and associated user public key storage in a Blockchain/PDL (see block 515). The identity framework 505 verifies the validity, scope of DID usage and authenticity of the DID by fetching the DID information and user documents (verifiable credentials). If any NF (e.g., the UDM, alternatively it may be a subscription provisioning server/onboarding server) from service provider/MNO domain requests any subscriber related information, then the identity framework 505 generates a Minimum Data Set ("MDS") with all required subscriber verifiable credentials (a minimum data set for example can contain subscriber name, subscriber location, DID validity, service payment info, service activation status, etc.).

In addition, if the service provider also request any security key request to protect the subscription onboarding, then identity framework 505 (e.g., ID/TSP) derives the Onboarding Root key ($K_{ONB\_Root}$) based on the security credentials available (for example, a public-private key pair and a shared secret key) in the UE. $K_{ONB\_Root}$ may be derived according to Equation 1 or Equation 2, above.

Alternatively, if the identity framework 505 (e.g., ID/TSP) receives a concealed SUOI/DID instead of a plaintext SUOI, the concealed SUOI is de-concealed using the private key related to the public key indicated by the public key ID. The rest of the process involved in the validation of DID fetched from SUOI, Minimum Data Set generation and onboarding key generation will be same as described above.

Alternatively, if the identity framework 505 (e.g., ID/TSP) receives a DID_TS with DS, the DID is used to locate the DID document and public key storage information. Then the user public key is fetched by the identity framework 505 to verify the digital signature of the DID along with the time stamp provided as part of DID_TS to verify that received DID is originating from the authorized user (i.e., UE 205).

At Step 7a, the identity framework 505 (e.g., ID/TSP) sends to D-IDASEF/BSEF 503 (or a NF in service provider domain) a subscriber ID verification response message containing verified DID, DID lifetime, DID verification result (Success or Failure), Minimum Data Set with user information and Onboard Root Key ($K_{ONB\_Root}$) (see messaging 517). The identity framework 505 determines the DID lifetime based on the lifetime of the credentials/DID documents associated with the UE's DID.

At Step 7b, the D-IDASEF/BSEF 503 forwards to AUSF/ UDM (e.g., a NF 501 in service provider domain) the received subscriber ID verification response message containing verified DID, DID lifetime, DID verification result (Success or Failure), Minimum Data Set with user information and Onboard Root Key ($K_{ONB\_Root}$) (see messaging 519). Alternatively, the D-IDASEF/BSEF 503 forwards to Provisioning Server (e.g., a NF 501 in service provider domain) the received subscriber ID verification response message containing verified DID, DID verification result (Success or Failure), Minimum Data Set with user information and Onboard Root Key ($K_{ONB\_Root}$).

At Step 8, the 3GPP NF 501 (e.g., AUSF/UDM), if receiving the DID verification result as 'success', then stores the received information such verified DID, DID verification result (Success or Failure), Minimum Data Set with user information and Onboard Root Key ($K_{ONB\_Root}$) in the UDR (see block 521). However, if the 3GPP NF 501 receives the DID verification result as 'failure', the 3GPP NF 501 may store the received information such verified DID, DID verification result (Failure) in the UDR.

The 3GPP NF 501 (e.g., UDM) further generates a nonce and derives an Onboarding Security Key ($K_{ONB\_Sec}$) from the received Onboard Root key using nonce as the input in key derivation as follows. The $K_{ONB\_Sec}$ is used to confidentiality and integrity protect the onboard container containing the User subscription information provisioned to the UE 205. The $K_{ONB\_Sec}$ may be derived using Equation 3. The $K_{ONB\_enc}$ may be derived using Equation 4. The $K_{ONB\_int}$ may be derived using Equation 5.

The 3GPP NF 501 (e.g., UDM) either fetches UE subscription information from a provisioning server or generates UE subscription information locally. The 3GPP NF 501 (e.g., UDM) may further construct an onboard container with the new user subscription information (K, SUPI/IMSI, AKA credentials, SUCI generation inputs such HN public key ID, protection scheme etc., Routing ID, Slice subscription information, Security information etc.). In certain embodiments, the 3GPP NF 501 (e.g., UDM) encrypts the onboard container with the Key $K_{ONB\_enc}$ and generates the MAC of the onboard container together with the OAI IE using the integrity key $K_{ONB\_int}$ to integrity protect the subscription information and related information sent to the UE. The OAI IE can contain information on onboard result with 'success indication', security algorithms and IDs used to identify the ciphering and integrity protection algorithms used to protect the onboard container (i.e., user subscription information) and related information (e.g., OAI).

Alternatively, the onboarding security keys may be derived from Onboard Root Key ($K_{ONB\_Root}$) using the new nonce as input and the onboarding security keys can be used to protect the subscription information related to subscription onboarding. In such embodiments, the $K_{ONB\_enc}$ may be derived using Equation 6, while the $K_{ONB\_int}$ may be derived using Equation 7.

Alternatively, all the above processing will be carried out by the provisioning server, if the provisioning server is involved in the subscription onboarding procedure instead of a UDM. Alternatively, the UDM may generates the onboarding security key(s) and provide it to the AMF along with the nonce and OAI with 'Required NAS protection indication' to trigger the AMF to protect the Onboard Container using the provided Onboard security key(s).

In one embodiment, the procedure 500 finishes by performing steps 9-16 from FIG. 3B. In another embodiment, the procedure 500 finishes by performing steps 9-16 from FIG. 4B.

In an alternative option, e.g., to support a Service Provider (example a content service provider or one who provided on-demand service) providing UE subscription Information via network operator (e.g., NPN/PLMN) to the UE, the procedure 500 may also be used for a scenario where a network operator-A provides network access to the users of Service provider-B using the credentials provided by the Service Provider B (based on User Online Sign Up for pay per use model).

Here for this scenario, the service provider-B will handle the messages of steps 5b, 6 and 7a and the service provider-B provides the user subscription information in the Minimum data Set in step 7a to the network operator-A after a successful DID based ID authentication. Then the network Operator-A will use the User subscription information related minimum data set to construct the complete User subscription information by adding network operator-A specific slice selection information (e.g., NSSAI) with other required network subscription information and provision the User subscription information to the UE using the procedure shown in FIG. 3B, alternatively FIG. 4B (the step descriptions are applicable according to the above modification regarding the network operator-A and the Service provider-B).

Figure 6:
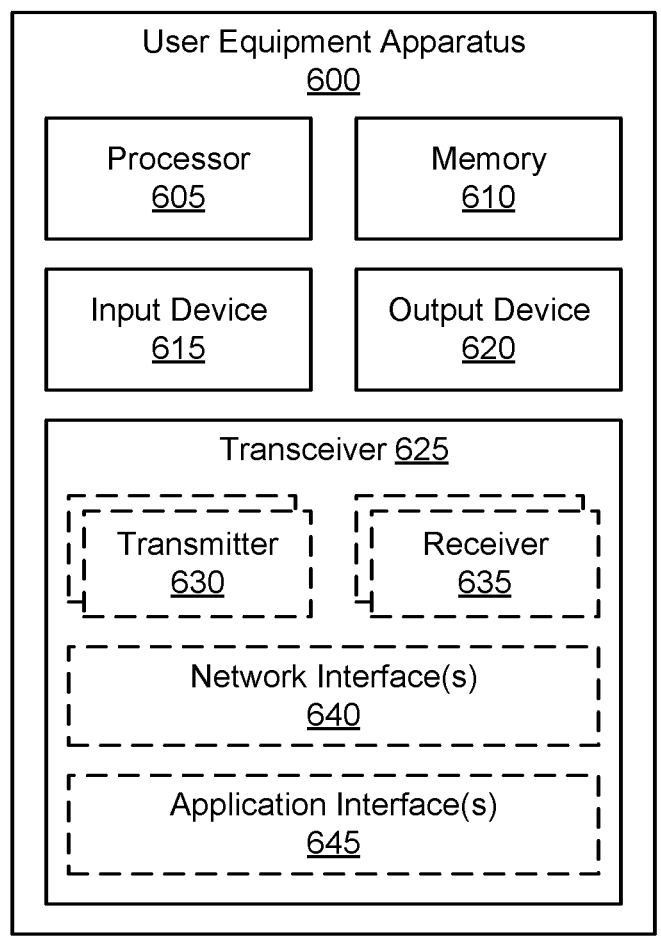
FIG. 6 is a diagram illustrating one embodiment of a user equipment apparatus that may be used for digital-ID-based subscription onboarding.

FIG. 6 depicts a user equipment apparatus 600 that may be used for digital-ID-based subscription onboarding, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more serving cells supported by one or more base units 121. Additionally, the transceiver 625 may support at least one network interface 640 and/or application interface 645. The application interface(s) 645 may support one or more APIs. The network interface(s) 640 may support 3GPP reference points, such as Uu and PC5. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. For example, the processor 605 controls the user equipment apparatus 600 to implement the above described UE behaviors. For example, the processor 605 acquires a DIG-ID, said DIG-ID comprising a verifiably secure identity. In some embodiments, the DIG-ID includes at least one of: a DID, a SSI, and a DOID. In certain embodiments, acquiring the DIG-ID includes purchasing a subscription associated with the mobile communication network and/or generating the DIG-ID at the UE.

The processor 605 generates a digital signature of the DIG-ID and a timestamp using a private key. In some embodiments, the DIG-ID is a verifiable secure identifier linked to verifiable credentials of the user that are stored on a trusted and decentralized platform or digital identifier infrastructure associated with the trust service provider and/or ID service provider. In such embodiments, the DIG-ID is used to perform user authentication during onboarding and subscription credential provisioning to the UE. In certain embodiments, the DIG-ID is contained within a username portion of a NAI, said NAI having the form <username@realm>. In such embodiments, the NAI may include the DIG-ID and at least one of: timestamp, digital signature, key related information, trust service provider information and/or identity service provider information.

Via the transceiver 625, the processor 605 sends a first request to a mobile communication network (i.e., to a serving MNO) and receives a first response. Here, the first request includes the DIG-ID, the timestamp and the generated digital signature, and the first response includes an onboarding authentication success indication and a verified DIG-ID.

In some embodiments, the first request contains a SUOI that contains the DIG-ID, the timestamp and the digital signature. In certain embodiments, the SUOI also includes one or more of: a DIG-ID type, a service provider identifier, ID service provider domain information and trust service provider domain information. In such embodiments, the digital signature is generated using the entire SUOI. Note that the digital signature aids the message recipient (i.e., serving MNO) to confirm that received ID and related information is not tampered with (e.g., altered) by any attackers.

In certain embodiments, the DIG-ID is protected using a shared-secret encryption key. Where the DIG-ID is protected using the shared-secret encryption key, the SUOI further includes a MAC of SUOI, public key of the user, and public key identifier corresponding to a ID service provider identified by the ID service provider information and/or a trust service provider identified by the trust service provider information.

The processor 605 establishes a provisioning connection to the mobile communication network and receives a subscription credential and/or a user subscription profile via the provisioning connection. In some embodiments, the DIG-ID includes at least one of: a DID, a SSI, and a DOID. In some embodiments, receiving the subscription credential and/or a user subscription profile includes receiving a protected onboarding container within a NAS message or user plane message which is protected using an encryption key and integrity key derived from a security key based on an Onboard root key.

In some embodiments, the first request includes a Registration Request that initiates a Registration procedure with the mobile communication network. In such embodiments, the subscription credential and/or a user subscription profile is provisioned to the UE in an Onboard Container during the Registration procedure over a NAS or a control plane message after a successful DIG-ID based user authentication and/or Onboard root key based Security set up. Here, the Security set up may be at least over Non-Access Stratum, and optionally may include the Access Stratum and User Plane.

In other embodiments, the first request includes an Onboarding Request. In such embodiments, the subscription credential and/or a user subscription profile is provisioned to the UE in an Onboarding Response and/or in a user plane message after a successful DIG-ID based user authentication and/or Onboard root key based security set up during an Onboarding and Provisioning procedure.

In some embodiments, receiving the subscription credential and/or a user subscription profile includes receiving a protected onboarding container within a NAS message from an AMF in the mobile communication network, wherein the NAS message include OAI, a nonce and a MAC. In such embodiments, the processor 605 may derive an Onboard root key using a shared secret key and a successfully verified DIG-ID and use the Onboard root key as an AUSF Key. The processor 605 may further derive at least one security key using the Onboard root key and using at least one of: the Nonce, PLMN identifier, and Network identifier.

The processor 605 may then use the one security key as a SEAF Key and either set up security with the network (i.e., NAS security, AS security and/or user plane security) or use the one security key to derive both an onboard confidentiality key to decrypt a protected onboard container and also an onboard integrity key to verify the MAC of the NAS message providing the protected onboard container. Additionally, the processor 605 may verify the MAC of the NAS message based on the OAI, where the OAI contains an onboard result with 'success indication' and one or more security algorithm identifiers. The processor 605 may decrypt and store the received subscription credential and/or a user subscription profile, in response to successfully verifying the MAC.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to digital-ID-based subscription onboarding. For example, the memory 610 may store UE identifiers, user identifiers, network function identifiers, encryption keys, security algorithms, digital signatures, message authentication codes, network resource identifiers, and the like. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
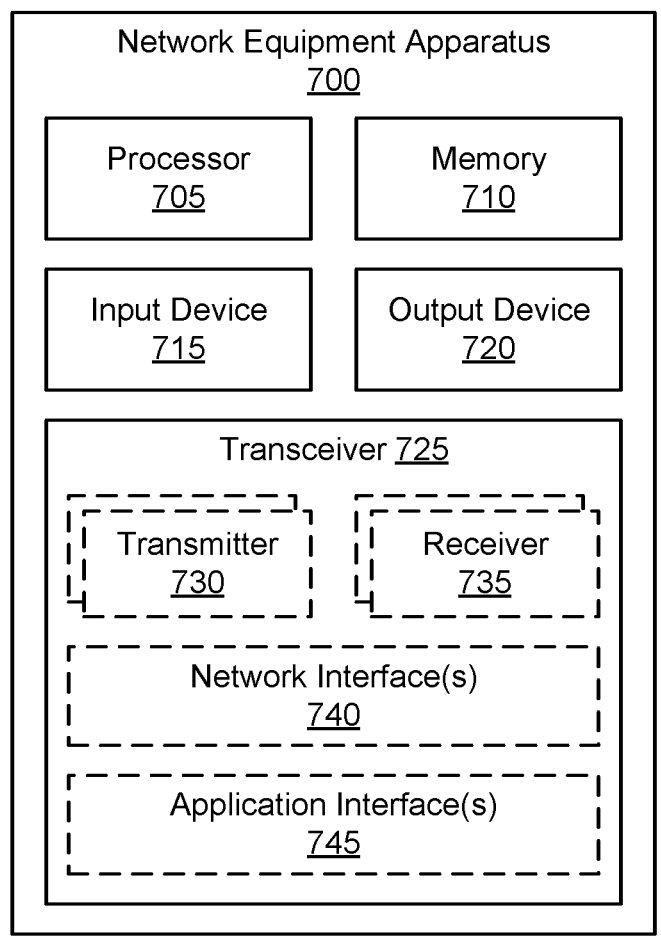
FIG. 7 is a diagram illustrating one embodiment of a network equipment apparatus that may be used for digital-ID-based subscription onboarding.

FIG. 7 depicts one embodiment of a network equipment apparatus 700 that may be used for digital-ID-based subscription onboarding, according to embodiments of the disclosure. In some embodiments, the network apparatus 700 may be one embodiment of a network function used to implement any of the solutions described above. For example, the network equipment apparatus 700 may comprise hardware and/or software resources to realize one of the above described network functions in a mobile communication network (i.e., PLMN, NPN and/or MNO), such as the AUSF 135, the D-IDASEF 137, the BSEF 138, the UDM/UDR 139, the O-AUSF 209, the AUSF 305, the UDM/UDR 307, a 3GPP NF 501, and/or the D-IDASEF/BSEF 503. Furthermore, network equipment apparatus 700 may include a processor 705, a memory 710, an input device 715, an output device 720, and a transceiver 725. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as N1, N3, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the network equipment apparatus 700 to implement the above described network function behaviors. For example, via the network interface 740, the processor 705 receives a first request, the message containing a DIG-ID of a UE, a timestamp and a digital signature, where the digital identifier includes a verifiably secure identity. For example, the DIG-ID may include at least one of: a DID, a SSI, a verifiably secure identifier, and a DOID.

In some embodiments, the DIG-ID is a verifiable secure identifier linked to verifiable credentials of the user that are stored on a trusted and decentralized platform or digital identifier infrastructure associated with the trust service provider and/or ID service provider. In such embodiments, the DIG-ID is used to perform user authentication during onboarding and subscription credential provisioning to the UE. In certain embodiments, the DIG-ID is contained within a username portion of a NAI, said NAI having the form <username@realm>. In some embodiments, the NAI may include the DIG-ID and at least one of: timestamp, digital signature, key related information, trust service provider information and/or identity service provider information.

In some embodiments, the first request contains a SUOI that includes the DIG-ID, the timestamp and the digital signature. In certain embodiments, the SUOI further includes one or more of: a DIG-ID type, a service provider identifier, ID service provider domain information and trust service provider domain information. In such embodiments, the digital signature is generated using the entire SUOI.

In certain embodiments, the DIG-ID is protected using a shared secret encryption key. Where the DIG-ID is protected using the shared secret encryption key, the SUOI further includes a MAC of SUOI, public key of the user, and/or public key identifier corresponding to a ID service provider identified by the ID service provider information and/or a trust service provider identified by the trust service provider information.

The processor 705 identifies a trust service provider based on the DIG-ID and controls the network interface 740 to send a verification request to the trust service provider. Here, the verification request contains the DIG-ID, the timestamp, the digital signature, a minimum data set request, and a security key request.

The processor 705 receives (e.g., via the network interface 740) a verified DIG-ID, a verification result, a DIG-ID lifetime, MDS information and the onboard root key from the service provider in response to successful verification of the DIG-ID. In various embodiments, the MDS information includes user information. In certain embodiments, invoking subscription provisioning of the UE based on the MDS information includes invoking a temporary subscription credential provisioning. In some embodiments, the MDS information includes at least one of: user information, subscription purchase information, subscription service-related information, subscription validity and a network resource for subscription provisioning (i.e., MNO subscription provisioning related URI/URL/address). In such embodiments, invoking subscription provisioning for the UE based on the MDS information may include invoking an actual user subscription profile provisioning.

In some embodiments, the processor stores the verified DIG-ID, a verification result, a DIG-ID lifetime, the MDS information, and the onboard root key in a DMF or a UDM/UDR of the mobile communication network. Specifically, the data may be stored in the UDR, with the UDM being a front end which provides access to the data. Here, the UDM and UDR together form a network function, referred to as "UDM/UDR."

The processor 705 invokes subscription provisioning of the UE based on the MDS information, where the subscription provisioning is protected using the onboard root key.

In some embodiments, the processor generates a nonce and deriving one or more security keys using the onboard root key and at least one of: the nonce, PLMN identifier, and Network identifier. In such embodiments, the processor uses the one security key to derive one or more onboard security keys (i.e., confidentiality key and integrity key to encrypt an onboard container and integrity protect the onboard container) and generating a plain text or protected onboarding container, and an OAI for the UE, where the onboarding container is protected using at least one of the derived security keys.

In certain embodiments, the processor fetches a default subscription credential for the DIG-ID from the DMF or UDM/UDR and deriving one or more onboard security keys. In such embodiments, the default subscription credential and the one or more onboard security keys are provided to a second network function that is an AMF and/or a SEAF.

In some embodiments, the processor uses the received onboard root key as an AUSF Key and providing the one security key as the SEAF key to the AMF/SEAF to set up security (i.e., NAS security, AS security and/or user plane security) with UE for provisioning connection. In certain embodiments, the second network function (i.e., AMF/SEAF) applies confidentiality protection and integrity protection to the onboarding container using an encryption key and integrity key derived from the received onboard security key in response to receiving the default subscription credential in an unprotected onboarding container. In such embodiments, the subscription provisioning of the UE includes the second network function sending a NAS message to the UE, said NAS message is either confidentiality and integrity protected or containing the protected onboarding container, Onboard Assistance Information, a Nonce, and a MAC.

In some embodiments, the onboarding container includes a subscription credential (i.e., SUPI), a secret long-term Key (denoted 'K'), Authentication and Key Agreement ("AKA") Credentials, and Slice Information (e.g., one or more S-NS-SAI). In certain embodiments, the subscription credential includes a Subscription unique permanent identifier. Moreover, the onboarding container may further include network access information and additional subscription information.

In some embodiments, the first request includes an authentication Request that initiates an authentication procedure with the mobile communication network. In such embodiments, the subscription credentials and/or a user subscription profile are provisioned to the UE after a successful DIG-ID based user authentication and/or Onboard root key based security set up using an Onboard Container over a NAS or a control plane message during the Registration procedure. Here, the Security set up may be at least over NAS, and optionally may include the Access Stratum (AS) and User Plane (UP) security set up. Note that the UE may send a registration request to the AMF/SEAF and then the AMF/SEAF, upon receiving the registration request, sends the authentication request to the AUSF with all information received in registration request.

In other embodiments, the first request includes an Onboarding Request. In such embodiments, a subscription credential and/or a user subscription profile is provisioned to the UE in an Onboarding Response and/or in a user plane message after a successful DIG-ID based user authentication and/or Onboard root key based security set up during an Onboarding and Provisioning procedure.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to digital-ID-based subscription onboarding, for example storing UE identifiers, user identifiers, network function identifiers, encryption keys, security algorithms, digital signatures, message authentication codes, network resource identifiers, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more network functions that provide access to one or more PLMNs. The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

Figure 8:
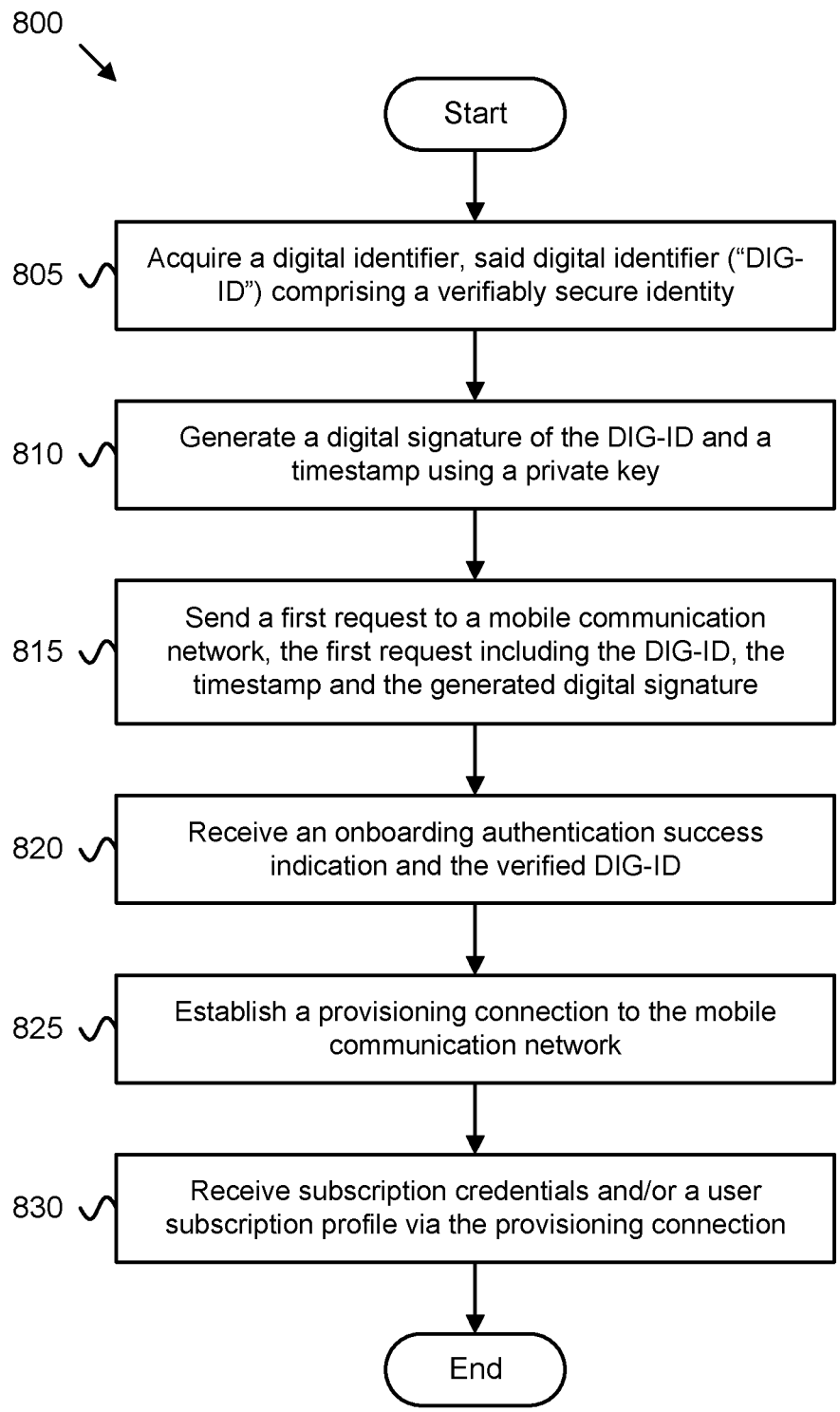
FIG. 8 is a flowchart diagram illustrating one embodiment of a method for digital-ID-based subscription onboarding.

FIG. 8 depicts one embodiment of a method 800 for digital-ID-based subscription onboarding, according to embodiments of the disclosure. In various embodiments, the method 800 is performed by a UE, such as the remote unit 105, the UE 205 and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and acquires 805 a DIG-ID, said DIG-ID comprising a verifiably secure identity. The method 800 includes generating 810 a digital signature of the DIG-ID and a timestamp using a private key. The method 800 includes sending 815 a first request to a mobile communication network (i.e., serving MNO), the first request including the DIG-ID, the timestamp and the generated digital signature. The method 800 includes receiving 820 an onboarding authentication success indication and a verified DIG-ID. The method 800 includes establishing 825 a provisioning connection to the mobile communication network. The method 800 includes receiving 830, via the provisioning connection, a subscription credential and/or a user subscription profile. The method 800 ends.

Figure 9:
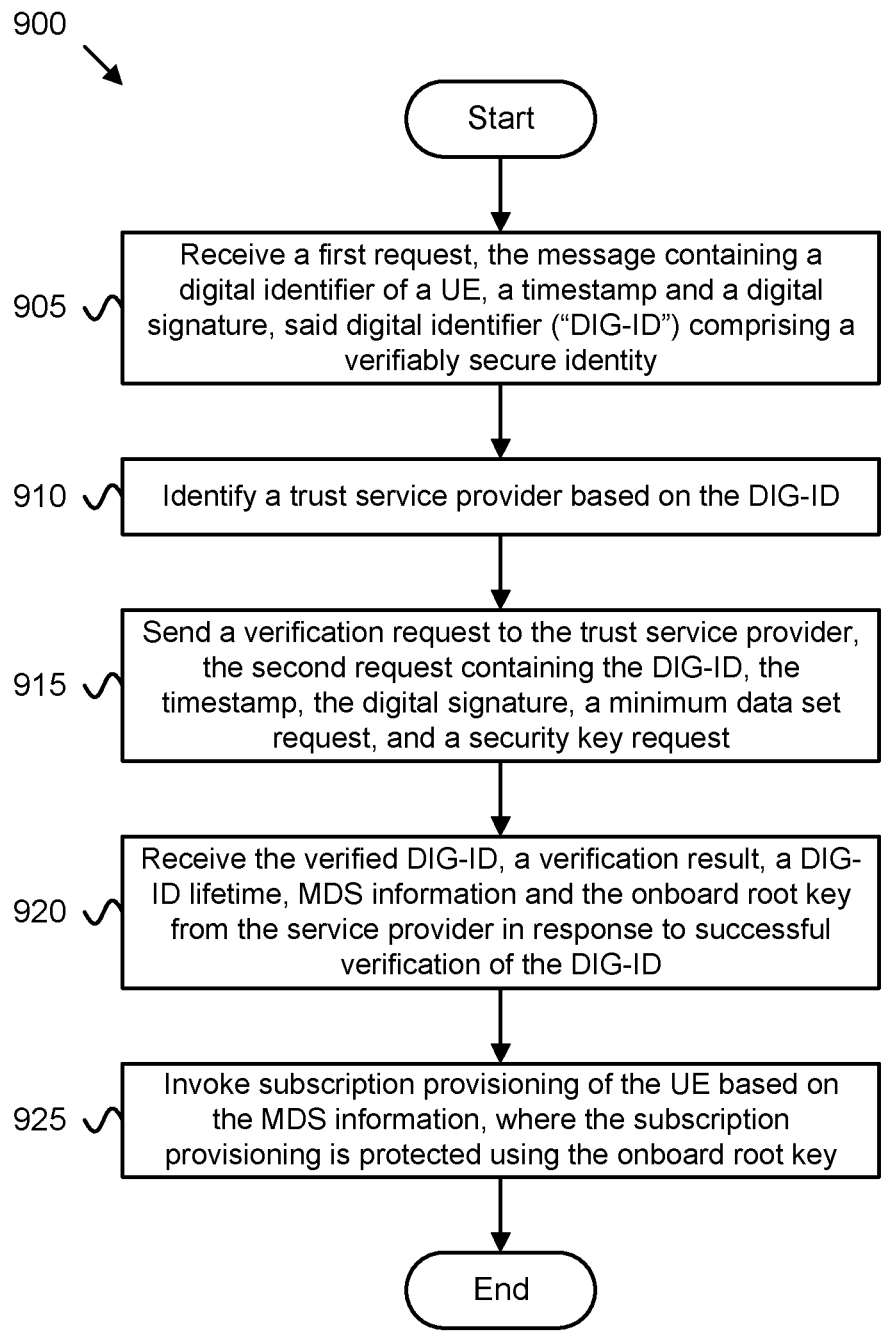
FIG. 9 is a flowchart diagram illustrating one embodiment of a method for digital-ID-based subscription onboarding.

FIG. 9 depicts one embodiment of a method 900 for digital-ID-based subscription onboarding, according to embodiments of the disclosure. In various embodiments, the method 900 is performed by a network function, such as the AUSF 135, the D-IDASEF 137, the BSEF 138, the UDM/UDR 139, the O-AUSF 209, the AUSF 305, the UDM/UDR 307, a 3GPP NF 501, and/or the D-IDASEF/BSEF 503, and/or the network equipment apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905 a first request, the message containing a DIG-ID of a UE, a timestamp and a digital signature, where the digital identifier includes a verifiably secure identity. The method 900 includes identifying 910 a trust service provider based on the DIG-ID. The method 900 includes sending 915 a verification request to the trust service provider. Here, the verification request contains the DIG-ID, the timestamp, the digital signature, a minimum data set request, and a security key request. The method 900 includes receiving 920 a verified DIG-ID, a verification result, a DIG-ID lifetime, MDS information and the onboard root key from the service provider in response to successful verification of the DIG-ID. The method 900 includes invoking 925 subscription provisioning of the UE based on the MDS information, where the subscription provisioning is protected using the onboard root key. The method 900 ends.

Disclosed herein is a first apparatus for digital-ID-based subscription onboarding, according to embodiments of the disclosure. The first apparatus may be implemented by a UE, such as the remote unit 105, the UE 205 and/or the user equipment apparatus 600, described above. The first apparatus includes a processor that acquires a DIG-ID, said DIG-ID comprising a verifiably secure identity. The processor generates a digital signature of the DIG-ID and a timestamp using a private key. The first apparatus includes a transceiver that sends a first request to a mobile communication network (i.e., to a serving MNO) and receives a first response, where the first request includes the DIG-ID, the timestamp and the generated digital signature, and where the first response includes an onboarding authentication success indication and a verified DIG-ID. The processor establishes a provisioning connection to the mobile communication network and receives a subscription credential and/or a user subscription profile via the provisioning connection.

In some embodiments, the first request contains a SUOI that includes the DIG-ID, the timestamp and the digital signature. In certain embodiments, the SUOI also includes one or more of: a DIG-ID type, a service provider identifier, ID service provider domain information and trust service provider domain information. In such embodiments, the digital signature is generated using the entire SUOI.

In certain embodiments, the DIG-ID is protected using a shared secret encryption key. In such embodiments, the SUOI further includes a MAC of SUOI, public key of the user, and public key identifier corresponding to a ID service provider identified by the ID service provider information and/or a trust service provider identified by the trust service provider information.

In some embodiments, the first request includes a Registration Request that initiates a Registration procedure with the mobile communication network. In such embodiments, the subscription credential and/or a user subscription profile is provisioned to the UE in an Onboard Container during the Registration procedure over a NAS or a control plane message after a successful DIG-ID based user authentication and/or Onboard root key based Security set up. Here, the Security set up may be at least over NAS, and optionally may include the AS and UP.

In other embodiments, the first request includes an Onboarding Request. In such embodiments, the subscription credential and/or a user subscription profile is provisioned to the UE in an Onboarding Response and/or in a user plane message after a successful DIG-ID based user authentication and/or Onboard root key based security set up during an Onboarding and Provisioning procedure.

In some embodiments, receiving the subscription credential and/or a user subscription profile includes receiving a protected onboarding container within a NAS message from an AMF in the mobile communication network, wherein the NAS message include OAI, a nonce and a MAC. In such embodiments, the processor may derive an Onboard root key using a shared secret key and a successfully verified DIG-ID and use the Onboard root key as an AUSF Key. The processor may further derive at least one security key using the Onboard root key and using at least one of: the Nonce, PLMN identifier, and Network identifier. The processor may then use the one security key as a SEAF Key and either set up security with the network (i.e., NAS security, AS security and/or user plane security) or use the one security key to derive both an onboard confidentiality key to decrypt a protected onboard container and also an onboard integrity key to verify the MAC of the NAS message providing the protected onboard container. Additionally, the processor may verify the MAC of the NAS message based on the OAI, where the OAI contains an onboard result with 'success indication' and one or more security algorithm identifiers. The processor may decrypt and store the received subscription credential and/or a user subscription profile, in response to successfully verifying the MAC.

In some embodiments, the DIG-ID includes at least one of: a DID, a SSI, and a DOID. In certain embodiments, acquiring the DIG-ID includes purchasing a subscription associated with the mobile communication network and/or generating the DIG-ID at the UE. In some embodiments, receiving the subscription credential and/or a user subscription profile includes receiving a protected onboarding container within a NAS message or user plane message which is protected using an encryption key and integrity key derived from a security key based on the Onboard root key.

In some embodiments, the DIG-ID is a verifiable secure identifier linked to verifiable credentials of the user that are stored on a trusted and decentralized platform or digital identifier infrastructure associated with the trust service provider and/or ID service provider. In such embodiments, the DIG-ID is used to perform user authentication during onboarding and subscription credential provisioning to the UE. In certain embodiments, the DIG-ID is contained within a username portion of a NAI, said NAI having the form <username@realm>. In such embodiments, the NAI may include the DIG-ID and at least one of: timestamp, digital signature, key related information, trust service provider information and/or identity service provider information.

Disclosed herein is a first method for digital-ID-based subscription onboarding, according to embodiments of the disclosure. The first method may be performed by a UE, such as the remote unit 105, the UE 205 and/or the user equipment apparatus 600, described above. The first method includes acquiring a DIG-ID, said DIG-ID comprising a verifiably secure identity. The first method includes generating a digital signature of the DIG-ID and a timestamp using a private key. The first method includes sending a first request to a mobile communication network (i.e., to a serving MNO), where the first request includes the DIG-ID, the timestamp and the generated digital signature. The first method includes receiving a first response from the mobile communication network, where the first response includes an onboarding authentication success indication and a verified DIG-ID. The first method includes establishing a provisioning connection to the mobile communication network. The first method includes receiving a subscription credential and/or a user subscription profile via the provisioning connection.

In some embodiments, the first request contains a SUOI that contains the DIG-ID, the timestamp and the digital signature. In certain embodiments, the SUOI also includes one or more of: a DIG-ID type, a service provider identifier, ID service provider domain information and trust service provider domain information. In such embodiments, the digital signature is generated using the entire SUOI.

In certain embodiments, the DIG-ID is protected using a shared secret encryption key. In such embodiments, the SUOI further includes a MAC of SUOI, public key of the user, and public key identifier corresponding to a ID service provider identified by the ID service provider information and/or a trust service provider identified by the trust service provider information.

In some embodiments, the first request includes a Registration Request that initiates a Registration procedure with the mobile communication network. In such embodiments, the subscription credential and/or a user subscription profile is provisioned to the UE in an Onboard Container during the Registration procedure over a NAS or a control plane message after a successful DIG-ID based user authentication and/or Onboard root key based Security set up. Here, the Security set up may be at least over NAS, and optionally may include the AS and UP. In other embodiments, the first request includes an Onboarding Request. In such embodiments, the subscription credential and/or a user subscription profile is provisioned to the UE in an Onboarding Response and/or in a user plane message after a successful DIG-ID based user authentication and/or Onboard root key based security set up during an Onboarding and Provisioning procedure.

In some embodiments, receiving the subscription credential and/or a user subscription profile includes receiving a protected onboarding container within a NAS message from an AMF in the mobile communication network, wherein the NAS message include OAI, a nonce and a MAC. In such embodiments, the first method may include: deriving an Onboard root key using a shared secret key and a successfully verified DIG-ID; using the Onboard root key as an AUSF Key; deriving at least one security key using the Onboard root key and using at least one of: the Nonce, PLMN identifier, and Network identifier; using the one security key as a SEAF Key and setting up security with the network (i.e., NAS security, AS security and/or user plane security) or using the one security key to derive an onboard confidentiality key to decrypt a protected onboard container and an onboard integrity key to verify the MAC of the NAS message providing the protected onboard container; verifying the MAC of the NAS message based on the OAI containing onboard result with 'success indication' and security algorithm identifier(s); and decrypting and storing the received subscription credential and/or a user subscription profile in response to successfully verifying the MAC.

In some embodiments, the DIG-ID includes at least one of: a DID, a SSI, and a DOID. In certain embodiments, acquiring the DIG-ID includes purchasing a subscription associated with the mobile communication network and/or generating the DIG-ID at the UE. In some embodiments, receiving the subscription credential and/or a user subscription profile includes receiving a protected onboarding container within a NAS message or user plane message which is protected using an encryption key and integrity key derived from a security key based on the Onboard root key.

In some embodiments, the DIG-ID is a verifiable secure identifier linked to verifiable credentials of the user that are stored on a trusted and decentralized platform or digital identifier infrastructure associated with the trust service provider and/or ID service provider. In such embodiments, the DIG-ID is used to perform user authentication during onboarding and subscription credential provisioning to the UE. In certain embodiments, the DIG-ID is contained within a username portion of a NAI, said NAI having the form <username@realm>. In such embodiments, the NAI may include the DIG-ID and at least one of: timestamp, digital signature, key related information, trust service provider information and/or identity service provider information.

Disclosed herein is a second apparatus for digital-ID-based subscription onboarding, according to embodiments of the disclosure. The second apparatus may be implemented by a network function in a mobile communication network (i.e., PLMN, NPN and/or MNO), such as the AUSF 135, the D-IDASEF 137, the BSEF 138, the UDM/UDR 139, the O-AUSF 209, the AUSF 305, the UDM/UDR 307, a 3GPP NF 501, and/or the D-IDASEF/BSEF 503, and/or the network equipment apparatus 700, described above.

The second apparatus includes a transceiver that receives a first request, the message containing a DIG-ID of a UE, a timestamp and a digital signature, where the digital identifier includes a verifiably secure identity. The second apparatus includes a processor that identifies a trust service provider based on the DIG-ID and controls the transceiver to send a verification request to the trust service provider. Here, the verification request contains the DIG-ID, the timestamp, the digital signature, a minimum data set request, and a security key request. The transceiver receives a verified DIG-ID, a verification result, a DIG-ID lifetime, MDS information and the onboard root key from the service provider in response to successful verification of the DIG-ID. The processor invokes subscription provisioning of the UE based on the MDS information, where the subscription provisioning is protected using the onboard root key.

In various embodiments, the MDS information includes user information. In certain embodiments, invoking subscription provisioning of the UE based on the MDS information includes invoking a temporary subscription credential provisioning. In some embodiments, the MDS information includes at least one of: user information, subscription purchase information, subscription service-related information, subscription validity and a network resource for subscription provisioning (i.e., MNO subscription provisioning related URI/URL/address). In such embodiments, invoking subscription provisioning for the UE based on the MDS information may include invoking an actual user subscription profile provisioning.

In some embodiments, the processor generates a nonce and deriving one or more security keys using the onboard root key and at least one of: the nonce, PLMN identifier, and Network identifier. In such embodiments, the processor uses the one security key to derive one or more onboard security keys (i.e., confidentiality key and integrity key to encrypt an onboard container and integrity protect the onboard container) and generating a plain text or protected onboarding container, and an OAI for the UE, where the onboarding container is protected using at least one of the derived security keys.

In some embodiments, the processor stores the verified DIG-ID, a verification result, a DIG-ID lifetime, the MDS information, and the onboard root key in a DMF or a UDM/UDR of the mobile communication network. Specifically, the data may be stored in the UDR, with the UDM being a front end which provides access to the data. Here, the UDM and UDR together form a network function, referred to as "UDM/UDR." In certain embodiments, the processor fetches a default subscription credential for the DIG-ID from the DMF or UDM/UDR and deriving one or more onboard security keys. In such embodiments, the default subscription credential and the one or more onboard security keys are provided to a second network function that is an AMF and/or a SEAF.

In some embodiments, the processor uses the received onboard root key as an AUSF Key and providing the one security key as the SEAF key to the AMF/SEAF to set up security (i.e., NAS security, AS security and/or user plane security) with UE for provisioning connection. In certain embodiments, the second network function (i.e., AMF/SEAF) applies confidentiality protection and integrity protection to the onboarding container using an encryption key and integrity key derived from the received onboard security key in response to receiving the default subscription credential in an unprotected onboarding container. In such embodiments, the subscription provisioning of the UE includes the second network function sending a NAS message to the UE, said NAS message is either confidentiality and integrity protected or containing the protected onboarding container, Onboard Assistance Information, a Nonce, and a MAC.

In some embodiments, the onboarding container includes a subscription credential (i.e., SUPI), a secret long-term Key (denoted 'K'), Authentication and Key Agreement ("AKA") Credentials, and Slice Information (e.g., one or more S-NS-SAI). In certain embodiments, the subscription credential includes a Subscription unique permanent identifier. Moreover, the onboarding container may further include network access information and additional subscription information.

In some embodiments, the first request contains a SUOI that includes the DIG-ID, the timestamp and the digital signature. In certain embodiments, the SUOI further includes one or more of: a DIG-ID type, a service provider identifier, ID service provider domain information and trust service provider domain information. In such embodiments, the digital signature is generated using the entire SUOI.

In certain embodiments, the DIG-ID is protected using a shared secret encryption key. In such embodiments, the SUOI further includes a MAC of SUOI, public key of the user, and public key identifier corresponding to a ID service provider identified by the ID service provider information and/or a trust service provider identified by the trust service provider information.

In some embodiments, the first request includes an authentication Request that initiates an authentication procedure with the mobile communication network. In such embodiments, the subscription credentials and/or a user subscription profile are provisioned to the UE after a successful DIG-ID based user authentication and/or Onboard root key based security set up using an Onboard Container over a NAS or a control plane message during the Registration procedure. Here, the Security set up may be at least over NAS, and optionally may include the AS and UP.

In other embodiments, the first request includes an Onboarding Request. In such embodiments, a subscription credential and/or a user subscription profile is provisioned to the UE in an Onboarding Response and/or in a user plane message after a successful DIG-ID based user authentication and/or Onboard root key based security set up during an Onboarding and Provisioning procedure.

In some embodiments, the DIG-ID is a verifiable secure identifier linked to verifiable credentials of the user that are stored on a trusted and decentralized platform or digital identifier infrastructure associated with the trust service provider and/or ID service provider. For example, the DIG-ID includes at least one of: a DID, a SSI, a verifiably secure identifier, and a DOID. In such embodiments, the DIG-ID is used to perform user authentication during onboarding and subscription credential provisioning to the UE. In certain embodiments, the DIG-ID is contained within a username portion of a NAI, said NAI having the form <username@realm>. In such embodiments, the NAI may include the DIG-ID and at least one of: timestamp, digital signature, key related information, trust service provider information and/or identity service provider information.

Disclosed herein is a second method for digital-ID-based subscription onboarding, according to embodiments of the disclosure. The second method may be performed by a network function in a mobile communication network (i.e., PLMN, NPN and/or MNO), such as the AUSF 135, the D-IDASEF 137, the BSEF 138, the UDM/UDR 139, the O-AUSF 209, the AUSF 305, the UDM/UDR 307, a 3GPP NF 501, and/or the D-IDASEF/BSEF 503, and/or the network equipment apparatus 700, described above. The second method includes receiving a first request, the message containing a DIG-ID of a UE, a timestamp and a digital signature, where the digital identifier includes a verifiably secure identity. The second method includes identifying a trust service provider based on the DIG-ID and sending a verification request to the trust service provider. Here, the verification request contains the DIG-ID, the timestamp, the digital signature, a minimum data set request, and a security key request. The second method includes receiving a verified DIG-ID, a verification result, a DIG-ID lifetime, MDS information and the onboard root key from the service provider in response to successful verification of the DIG-ID. The second method includes invoking subscription provisioning of the UE based on the MDS information, where the subscription provisioning is protected using the onboard root key.

In various embodiments, the MDS information includes user information. In certain embodiments, invoking subscription provisioning of the UE based on the MDS information includes invoking a temporary subscription credential provisioning. In some embodiments, the MDS information includes at least one of: user information, subscription purchase information, subscription service-related information, subscription validity and a network resource for subscription provisioning (i.e., MNO subscription provisioning related URI/URL/address). In such embodiments, invoking subscription provisioning for the UE based on the MDS information may include invoking an actual user subscription profile provisioning.

In some embodiments, the second method includes generating a nonce and deriving one or more security keys using the onboard root key and at least one of: the nonce, PLMN identifier, and Network identifier. In such embodiments, the second method further includes using the one security key to derive one or more onboard security keys (i.e., confidentiality key and integrity key to encrypt an onboard container and integrity protect the onboard container) and generating a plain text or protected onboarding container, and an OAI for the UE, where the onboarding container is protected using at least one of the derived security keys.

In some embodiments, the second method includes storing the verified DIG-ID, a verification result, a DIG-ID lifetime, the MDS information, and the onboard root key in a DMF or a UDM/UDR of the mobile communication network. Specifically, the data may be stored in the UDR, with the UDM being a front end which provides access to the data. Here, the UDM and UDR together form a network function, referred to as "UDM/UDR." In certain embodiments, the second method includes fetching a default subscription credential for the DIG-ID from the DMF or UDM/UDR and deriving one or more onboard security keys. In such embodiments, the default subscription credential and the one or more onboard security keys are provided to a second network function that is an AMF and/or a SEAF.

In some embodiments, the second method includes using the received onboard root key as an AUSF Key and providing the one security key as the SEAF key to the AMF/SEAF to set up security (i.e., NAS security, AS security and/or user plane security) with UE for provisioning connection. In certain embodiments, the second network function (i.e., AMF/SEAF) applies confidentiality protection and integrity protection to the onboarding container using an encryption key and integrity key derived from the received onboard security key in response to receiving the default subscription credential in an unprotected onboarding container. In such embodiments, the subscription provisioning of the UE includes the second network function sending a NAS message to the UE, said NAS message is either confidentiality and integrity protected or containing the protected onboarding container, Onboard Assistance Information, a Nonce, and a MAC.

In some embodiments, the onboarding container includes a subscription credential (i.e., SUPI), a secret long-term Key (denoted 'K'), Authentication and Key Agreement ("AKA") Credentials, and Slice Information (e.g., one or more S-NS-SAI). In certain embodiments, the subscription credential includes a Subscription unique permanent identifier. Moreover, the onboarding container may further include network access information and additional subscription information.

In some embodiments, the first request contains a SUOI that includes the DIG-ID, the timestamp and the digital signature. In certain embodiments, the SUOI further includes one or more of: a DIG-ID type, a service provider identifier, ID service provider domain information and trust service provider domain information. In such embodiments, the digital signature is generated using the entire SUOI.

In certain embodiments, the DIG-ID is protected using a shared secret encryption key. In such embodiments, the SUOI further includes a MAC of SUOI, public key of the user, and public key identifier corresponding to a ID service provider identified by the ID service provider information and/or a trust service provider identified by the trust service provider information.

In some embodiments, the first request includes an authentication Request that initiates an authentication procedure with the mobile communication network. In such embodiments, the subscription credentials and/or a user subscription profile are provisioned to the UE after a successful DIG-ID based user authentication and/or Onboard root key based security set up using an Onboard Container over a NAS or a control plane message during the Registration procedure. Here, the Security set up may be at least over NAS, and optionally may include the AS and UP.

In other embodiments, the first request includes an Onboarding Request. In such embodiments, a subscription credential and/or a user subscription profile is provisioned to the UE in an Onboarding Response and/or in a user plane message after a successful DIG-ID based user authentication and/or Onboard root key based security set up during an Onboarding and Provisioning procedure.

In some embodiments, the DIG-ID is a verifiable secure identifier linked to verifiable credentials of the user that are stored on a trusted and decentralized platform or digital identifier infrastructure associated with the trust service provider and/or ID service provider. For example, the DIG-ID includes at least one of: a DID, a SSI, a verifiably secure identifier, and a DOID. In such embodiments, the DIG-ID is used to perform user authentication during onboarding and subscription credential provisioning to the UE. In certain embodiments, the DIG-ID is contained within a username portion of a NAI, said NAI having the form <username@realm>. In such embodiments, the NAI may include the DIG-ID and at least one of: timestamp, digital signature, key related information, trust service provider information and/or identity service provider information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment ("UE"), the method comprising:
    acquiring a digital identifier ("DIG-ID") comprising a verifiably secure identity;
    generating a digital signature of the DIG-ID and a timestamp using a private key;
    sending a first request to a mobile communication network, the first request including the DIG-ID, the timestamp, and the generated digital signature;
    receiving an onboarding authentication success indication and a verified DIG-ID;
    establishing a provisioning connection to the mobile communication network; and
    receiving at least one of a subscription credential and a user subscription profile via the provisioning connection.

2. The method of claim 1,
    wherein the first request contains a subscription unique onboarding identifier ("SUOI"), the SUOI containing the DIG-ID, the timestamp and the digital signature, wherein the SUOI further includes one or more of: a DIG-ID type, a service provider identifier, identity ("ID") service provider domain information and trust service provider domain information, wherein the digital signature is generated using the SUOI,
    wherein the SUOI further includes a message authentication code ("MAC") of SUOI, public key of a user, and a public key identifier corresponding to a service provider identifier identified by the ID service provider domain information or the trust service provider domain information, if the DIG-ID is protected using a shared secret encryption key.

3. The method of claim 1, wherein the first request comprises a registration request that initiates a registration procedure with the mobile communication network, wherein the subscription credential or the user subscription profile is received by the UE in an onboard container over a non-access stratum ("NAS") or a control plane message after a successful DIG-ID based user authentication or onboard root key-based security set up during the registration procedure.

4. The method of claim 1, wherein the first request comprises an onboarding request container, wherein the subscription credential or the user subscription profile is received by the UE in an onboarding response or in a user plane message after a successful DIG-ID based user authentication or onboard root key-based security set up during an onboarding and provisioning procedure.

5. The method of claim 1, wherein the DIG-ID comprises at least one of: a decentralized identifier ("DID"), a self-sovereign identifier ("SSI"), and a digital onboarding identifier ("DOID"), wherein acquiring the DIG-ID comprises purchasing a subscription associated with the mobile communication network or generating the DIG-ID at the UE.

6. The method of claim 1,
    wherein receiving subscription credentials or the user subscription profile comprises receiving a protected onboarding container from an access and mobility management function ("AMF") in the mobile communication network,
    wherein the protected onboarding container is received within a non-access stratum ("NAS") message or user plane message that is protected using an encryption key and integrity key derived from a security key based on onboard root key,
    wherein the NAS message includes onboarding assistance information ("OAI"), a nonce and a message authentication code ("MAC").

7. The method of claim 6, further comprising:
    deriving an onboard root key using a shared secret key and a successfully verified DIG-ID;
    using the onboard root key as an authentication server function ("AUSF") key;
    deriving at least one security key using the onboard root key and using at least one of: the nonce, a plublic land mobile network ("PLMN") identifier, and a network identifier;
    using the at least one security key as a security anchor key and setting up security with the mobile communication network or using the at least one security key to derive an onboard confidentiality key to decrypt a protected onboard container and an onboard integrity key to verify the MAC of the NAS message providing the protected onboard container;
    verifying the MAC of the NAS message based on the OAI containing onboard result with 'success indication' and one or more security algorithm identifiers; and
    decrypting and storing the received subscription credentials or the user subscription profile in response to successfully verifying the MAC.

8. A method of a network function in a mobile communication network, the method comprising:
    receiving a first request message comprising a digital identifier ("DIG-ID") of a user equipment ("UE"), a timestamp and a digital signature, the DIG-ID comprising a verifiably secure identity;

identifying a trust service provider based on the DIG-ID;

sending a verification request to the trust service provider, the verification request containing the DIG-ID, the timestamp, the digital signature, a minimum data set request, and a security key request;

receiving a verified DIG-ID, a verification result, a DIG-ID lifetime, minimum data set ("MDS") information and an onboard root key from the trust service provider in response to successful verification of the DIG-ID; and invoking subscription provisioning of the UE based on the MDS information, wherein the subscription provisioning is protected using the onboard root key.

9. The method of claim 8, wherein the MDS information comprises at least user information, wherein invoking subscription provisioning of the UE based on the MDS information comprises invoking a temporary subscription credential provisioning in response to the MDS information only containing user information, wherein invoking subscription provisioning of the UE based on the MDS information comprises invoking an actual user subscription profile provisioning in response to the MDS information containing user information and one or more of subscription purchase information, subscription service related information, subscription validity or a network resource for subscription provisioning.

10. The method of claim 8, further comprising:

generating a nonce;

deriving one or more security keys using the onboard root key and at least one of:
 the nonce, a public land mobile network ("PLMN") identifier, and a network identifier;

using the one security key to derive onboard security keys;

generating a plain text or protected onboarding container, and an OAI for the UE, the protected onboarding container being protected using at least one of the derived security keys; and storing the verified DIG-ID, a verification result, a DIG-ID lifetime, the MDS information, and the onboard root key in a data management function ("DMF") or a unified data management and unified data repository ("UDM/UDR") of the mobile communication network.

11. The method of claim 10, further comprising fetching a default subscription credential for the DIG-ID from the DMF or UDM/UDR and deriving one or more onboard security keys, wherein the default subscription credential and the one or more onboard security keys are provided to a second network function that is one of: an access and mobility management function ("AMP") and a security anchor function ("SEAF").

12. The method of claim 11, further using the received onboard root key as an authentication server function ("AUSF") key and providing the one security key as security anchor key to the AMF or SEAF to set up security with the UE for provisioning connection.

13. The method of claim 10, wherein confidentiality protection and integrity protection is applied to the protected onboarding container using an encryption key and an integrity key derived from the one or more onboard security key in response to receiving the default subscription credential in an unprotected onboarding container, wherein the subscription provisioning of the UE comprises a non-access stratum ("NAS") message that is confidentiality and integrity protected or contains the protected onboarding container, onboard assistance information, a nonce, and a message authentication code ("MAC").

14. The method of claim 13, wherein the protected onboarding container includes a subscription credential, a secret long-term key (K), authentication and key agreement ("AKA") credentials, and slice information, and wherein the subscription credential comprises a subscription unique permanent identifier, wherein the protected onboarding container further includes network access information and additional subscription information.

15. The method of claim 8, wherein the first request contains a subscription unique onboarding identifier ("SUOI"), the SUOI containing the DIG-ID, the timestamp and the digital signature, wherein the SUOI further includes one or more of: a DIG-ID type, a service provider identifier, identity ("ID") service provider domain information and trust service provider domain information, wherein the digital signature is generated using the SUOI.

16. The method of claim 15, wherein the SUOI further includes a message authentication code ("MAC") of SUOI, public key of a user, and a public key identifier corresponding to a service provider identifier by the ID service provider domain information or the trust service provider domain information, if the DIG-ID is protected using a shared secret encryption key.

17. The method of claim 8, wherein the first request comprises an authentication request that initiates an authentication procedure with the mobile communication network, wherein subscription credentials or a user subscription profile are provisioned to the UE after a successful DIG-ID based user authentication or onboard root key based security set up in an onboard container over a non-access stratum ("NAS") or a control plane message during a registration procedure.

18. The method of claim 8, wherein the first request comprises an onboarding request, wherein a subscription credential or a user subscription profile is provisioned to the UE in an onboarding response or in a user plane message during an onboarding and provisioning procedure.

19. The method of claim 8, wherein the DIG-ID is linked to verifiable credentials of a user that are stored on a trusted and decentralized platform or DIG-ID infrastructure associated with the trust service provider or ID service provider;

wherein the DIG-ID comprises at least one of: a decentralized identifier ("DID"), a self-sovereign identifier ("SSI"), the verifiably secure identity, and a digital onboarding identifier ("DOID");

wherein the DIG-ID is used to perform user authentication during onboarding and subscription credentials provisioning to the UE.

20. The method of claim 19, wherein the DIG-ID is contained within a username portion of a network access identifier ("NAI"), the NAI comprising the DIG-ID and at least one of: a timestamp, a digital signature, key related information, trust service provider domain information or identity service provider domain information, wherein the NAI has a form <username@realm>.

* * * * *